United States Patent
Pearson et al.

(10) Patent No.: US 7,468,409 B2
(45) Date of Patent: *Dec. 23, 2008

(54) POLYESTER COMPOSITIONS

(75) Inventors: Jason Clay Pearson, Kingsport, TN (US); Douglas Stephens McWilliams, Kingsport, TN (US); Gether Irick, Jr., Gray, TN (US); Max Allen Weaver, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 413 days.

This patent is subject to a terminal disclaimer.

(21) Appl. No.: 11/204,869

(22) Filed: Aug. 16, 2005

(65) Prior Publication Data

US 2005/0288401 A1 Dec. 29, 2005

(51) Int. Cl.
*C08K 5/3492* (2006.01)
*C08K 5/524* (2006.01)
*C08K 5/527* (2006.01)

(52) U.S. Cl. .................. 524/99; 524/100; 524/124; 524/136; 524/138

(58) Field of Classification Search .................. 524/99, 524/100, 124, 136, 138
See application file for complete search history.

(56) References Cited

U.S. PATENT DOCUMENTS

| | | | |
|---|---|---|---|
| 3,169,121 A | 2/1965 | Goldberg | |
| 3,207,814 A | 9/1965 | Goldberg | |
| 3,218,372 A | 11/1965 | Okamura et al. | |
| 3,953,539 A | 4/1976 | Kawase et al. | |
| 4,025,492 A | 5/1977 | Binsack et al. | |
| 4,028,527 A | 6/1977 | Thagard | |
| 4,088,709 A | 5/1978 | Seymour et al. | |
| 4,136,089 A | 1/1979 | Bier et al. | |
| 4,156,069 A | 5/1979 | Prevorsek et al. | |
| 4,176,224 A | 11/1979 | Bier et al. | |
| 4,188,314 A | 2/1980 | Fox et al. | |
| 4,194,038 A | 3/1980 | Baker et al. | |
| 4,208,527 A | 6/1980 | Horlbeck et al. | |
| 4,238,593 A | 12/1980 | Duh | |
| 4,331,586 A | 5/1982 | Hardy | |
| 4,374,961 A | 2/1983 | Kudo et al. | |
| 4,391,954 A | 7/1983 | Scott | |
| 4,393,158 A | 7/1983 | Miller | |
| 4,401,804 A | 8/1983 | Wooten et al. | |
| 4,429,077 A | 1/1984 | Karrer et al. | |
| 4,430,484 A | 2/1984 | Quinn | |
| 4,452,932 A | 6/1984 | Brunelle | |
| 4,452,933 A | 6/1984 | McCready | |
| 4,456,717 A | 6/1984 | Elmers et al. | |
| 4,465,820 A | 8/1984 | Miller et al. | |
| 4,532,290 A | 7/1985 | Jaquiss et al. | |
| 4,587,328 A | 5/1986 | Goldberg | |
| 4,619,956 A | 10/1986 | Susi | |
| 4,786,692 A | 11/1988 | Allen et al. | |
| 4,879,355 A | 11/1989 | Light et al. | |
| 4,956,407 A | 9/1990 | Funasaki et al. | |
| 4,957,953 A | 9/1990 | Kikkawa et al. | |
| 4,981,898 A | 1/1991 | Bassett | |
| 4,994,549 A * | 2/1991 | Chiolle et al. ............... 528/272 |
| 5,010,146 A | 4/1991 | Kohsaka et al. | |
| 5,011,877 A | 4/1991 | Morris et al. | |
| 5,116,905 A | 5/1992 | Belfoure et al. | |
| 5,134,181 A | 7/1992 | Masina | |
| 5,180,762 A | 1/1993 | Canova | |
| 5,194,523 A | 3/1993 | Small, Jr. et al. | |
| 5,207,967 A | 5/1993 | Small, Jr. et al. | |
| 5,239,020 A | 8/1993 | Morris | |
| 5,254,610 A | 10/1993 | Small, Jr. et al. | |
| 5,283,295 A | 2/1994 | Light et al. | |
| 5,354,791 A | 10/1994 | Gallucci | |
| 5,420,212 A | 5/1995 | Light | |
| 5,441,997 A | 8/1995 | Walsh et al. | |
| 5,461,120 A | 10/1995 | Mason et al. | |
| 5,478,896 A | 12/1995 | Scott | |
| 5,606,007 A | 2/1997 | Sakashita et al. | |
| 5,679,733 A | 10/1997 | Malik et al. | |

(Continued)

FOREIGN PATENT DOCUMENTS

EP 0 272 417 6/1988

(Continued)

OTHER PUBLICATIONS

Anni Berger-Schunn, "Practical Color Measurement," 1994, pp. 39-56, 91-98, Wiley, NY.
"Plastics Adhesive Handbook," 5th Ed, 2001, pp. 98-108, Hanser Gradner Publs., Inc., Cincinnati, OH.
Hiemenz, "Polymer Chemistry," 1984, pp. 488-495, Marcel Dekker, NY.
Pospisil et al., "Handbook of Polymer Degradation," 2nd ED, 2000, pp. 241-242, S. Halim Hamid Ed., Marcel Dekker, NY.
Manas Chanda, "Advanced Polymer Chemistry," 2000, pp. 742-755 and 791-796, Marcel Dekker, NY.
Wilfong, "Linear Polyesters," *Journal of Polymer Science*, 1961, pp. 385-410, 54.

(Continued)

*Primary Examiner*—Peter Szekely
(74) *Attorney, Agent, or Firm*—B.J. Boshears; Louis N. Moreno; Bernard J. Graves, Jr.

(57) ABSTRACT

Disclosed are polymer compositions comprising:
(A) at least one polyester prepared by the reaction of at least one diol with at least one dicarboxylic acid or dialkyl ester thereof in the presence of a metallic catalyst; and
(B) at least one salt prepared from the reaction of one or more acidic phosphorus-containing compounds and one or more basic organic compounds which contain nitrogen.
The polyester compositions exhibit improved color, especially when used as a component of a polyester/polycarbonate blend. Also disclosed are polymer compositions comprising a polycarbonate in combination with components (A) and (B).

46 Claims, No Drawings

U.S. PATENT DOCUMENTS

| | | | |
|---|---|---|---|
| 5,684,071 A * | 11/1997 | Mogami et al. | 524/100 |
| 5,714,530 A | 2/1998 | Waterman | |
| 5,719,217 A | 2/1998 | Gugumus | |
| 5,721,298 A | 2/1998 | Waterman | |
| 5,744,526 A | 4/1998 | Goossens et al. | |
| 5,744,554 A | 4/1998 | Pfaendner et al. | |
| 5,859,116 A * | 1/1999 | Shih | 524/493 |
| 5,898,058 A * | 4/1999 | Nichols et al. | 528/286 |
| 5,907,026 A | 5/1999 | Factor et al. | |
| 5,922,816 A | 7/1999 | Hamilton | |
| 5,942,585 A | 8/1999 | Scott et al. | |
| 5,965,261 A | 10/1999 | Webster | |
| 5,965,643 A | 10/1999 | Gugumus | |
| 5,981,690 A * | 11/1999 | Lustig et al. | 528/279 |
| 6,005,059 A | 12/1999 | Scott et al. | |
| 6,011,124 A | 1/2000 | Scott et al. | |
| 6,037,424 A | 3/2000 | Scott et al. | |
| 6,043,322 A | 3/2000 | Scott et al. | |
| 6,051,164 A | 4/2000 | Samuels | |
| 6,077,890 A | 6/2000 | Hudson et al. | |
| 6,103,796 A | 8/2000 | Stanick et al. | |
| 6,107,375 A | 8/2000 | Krishman et al. | |
| 6,114,420 A | 9/2000 | Zedda et al. | |
| 6,147,016 A * | 11/2000 | Saiki et al. | 442/65 |
| 6,221,556 B1 | 4/2001 | Gallucci et al. | |
| 6,254,950 B1 | 7/2001 | Rogers et al. | |
| 6,306,939 B1 | 10/2001 | Gupta et al. | |
| 6,310,140 B1 | 10/2001 | Raetzsch et al. | |
| 6,323,291 B1 | 11/2001 | Mason et al. | |
| 6,333,113 B2 | 12/2001 | Sugie et al. | |
| 6,348,591 B1 | 2/2002 | Gupta et al. | |
| 6,455,616 B1 | 9/2002 | Cogen | |
| 6,469,083 B1 | 10/2002 | Opalko | |
| 6,476,158 B1 | 11/2002 | England et al. | |
| 6,500,887 B1 | 12/2002 | Tobita et al. | |
| 6,509,399 B2 | 1/2003 | Gupta et al. | |
| 6,545,073 B1 | 4/2003 | Blount | |
| 6,569,957 B2 | 5/2003 | Williams et al. | |
| 6,653,474 B1 | 11/2003 | Kersjes et al. | |
| 6,727,303 B2 | 4/2004 | Ono et al. | |
| 6,780,917 B2 | 8/2004 | Hashimoto et al. | |
| 2002/0086953 A1 | 7/2002 | Williams et al. | |
| 2002/0128357 A1 | 9/2002 | Gossens et al. | |
| 2004/0143041 A1 | 7/2004 | Pearson et al. | |

FOREIGN PATENT DOCUMENTS

| | | |
|---|---|---|
| EP | 0 294 862 | 12/1988 |
| EP | 0 295 730 | 12/1988 |
| EP | 0 466 137 A2 | 1/1992 |
| EP | 0 483 488 A1 | 5/1992 |
| EP | 0 537 837 A1 | 4/1993 |
| EP | 0 543 125 | 5/1993 |
| EP | 0 661 342 A1 | 7/1995 |
| EP | 0 675 159 A1 | 10/1995 |
| EP | 1 304 351 | 4/2003 |
| GB | 1466154 | 3/1977 |
| GB | 1466261 | 3/1977 |
| JP | 04-059852 | 6/1990 |
| JP | 04-011660 | 1/1992 |
| JP | 04-059852 | 2/1992 |
| JP | 10-001602 | 1/1998 |
| JP | 10-298439 | 11/1998 |
| WO | WO 0 438 488 A1 | 5/1992 |
| WO | WO 02/053633 A2 | 7/2002 |
| WO | WO 2004/065472 A1 | 8/2004 |

OTHER PUBLICATIONS

USPTO Office Action dated Nov. 3, 2005, for U.S. Appl. No. 11/204,864.
USPTO Office Action dated Oct. 6, 2004, for U.S. Appl. No. 10/379,783.
USPTO Office Action dated May 4, 2005, for U.S. Appl. No. 10/379,783.
USPTO Office Action dated Dec. 7, 2004, for U.S. Appl. No. 10/379,649.
USPTO Office Action dated Aug. 3, 2004, for U.S. Appl. No. 10/379,649.
USPTO Office Action dated Aug. 5, 2003, for U.S. Appl. No. 10/382,013.
USPTO Office Action dated Aug. 2, 2004, for U.S. Appl. No. 10/393,475.
USPTO Office Action dated Dec. 7, 2004, for U.S. Appl. No. 10/393,475.
USPTO Office Action dated Oct. 25, 2005, for U.S. Appl. No. 10/392,575.
Copending U.S. Appl. No. 11/204,864, filed Aug. 16, 2005.
Copending U.S. Appl. No. 11/204,460, filed Aug. 16, 2005.
Copending U.S. Appl. No. 10/639,712, filed Mar. 5, 2003.
Copending U.S. Appl. No. 11/204,870, filed Aug. 16, 2005.
Copending U.S. Appl. No. 10/772,121, filed Feb. 4, 2004.
Copending U.S. Appl. No. 11/204,461, filed Aug. 16, 2005.
Copending U.S. Appl. No. 11/204,867, filed Aug. 16, 2005.
Copending U.S. Appl. No. 10/392,575, filed Mar. 20, 2003.
USPTO office action dated Mar. 17, 2006 for copending U.S. Appl. No. 10/772,121.
USPTO office action dated Jul. 20, 2006 for copending U.S. Appl. No. 10/392,575.
USPTO Office Action dated Jul. 28, 2006 for copending U.S. Appl. No. 11/204,864.
USPTO Office Action dated Sep. 8, 2006 for copending U.S. Appl. No. 10/772,121.
USPTO office action dated Sep. 25, 2006 for copending U.S. Appl. No. 10/639,712.
USPTO office action dated Nov. 16, 2006 for copending U.S. Appl. No. 11/204,460.
USPTO office action dated Feb. 15, 2007 for copending U.S. Appl. No. 10/772,121.
USPTO Office Action dated Apr. 19, 2007 for copending U.S. Appl. No. 11/204,864.
USPTO Office Action dated Mar. 26, 2007 for copending U.S. Appl. No. 10/392,575.
USPTO Office Action dated May 16, 2007 for copending U.S. Appl. No. 10/639,712.

* cited by examiner

POLYESTER COMPOSITIONS

RELATED APPLICATONS

This application claims priority to and the benefit of the following applications; U.S. Patent Ser. No. 60/439,681 filed Jan. 13, 2003, incorporated herein by reference; and U.S. patent Ser. No. 10/379,649 filed Mar. 5, 2003, incorporated herein by reference.

FIELD OF THE INVENTION

This invention relates to a polymer composition comprising (A) at least one polyester prepared by the reaction of at least one diol with at least one dicarboxylic acid/or dialkyl ester thereof in the presence of a metallic catalyst; and (B) a salt composed of at least one suitable phosphorus-containing acid and at least one suitable basic organic compound, such as a hindered amine light stabilizer. A second embodiment of the present invention pertains to a blend of (A) at least one polyester prepared by the reaction of at least one diol with at least one dicarboxylic acid/or dialkyl ester thereof in the presence of a metallic catalyst; (B) a salt composed of at least one suitable phosphorus-containing acid and at least one suitable basic organic compound and (C) a polycarbonate.

BACKGROUND OF THE INVENTION

Methods for deactivating metallic catalyst residues in polyester and polyester-polycarbonate compositions are known in the art; however, it is desirable to find improved methods for deactivating such residues. It is also desirable to find methods for deactivating catalyst residues that provide compositions with greater hydrolytic stability, that are less detrimental to process equipment, provide better color, and less batch-to-batch variation in color.

It is known in the art that certain phosphorus-containing compounds are useful for deactivating metallic catalysts residues. Reference is made, for example, to U.S. Pat. No. 3,218,372 (Okamura et al.), U.S. Pat. No. 4,532,290 (Jaquiss et al.), U.S. Pat. No. 4,088,709 (Seymour et al.), U.S. Pat. No. 4,401,804 (Wooten et al.), U.S. Pat. No. 5,922,816 (Hamilton) and European Patents 0543125 (Van Helmond), 0294862 (Verhoeven), 0295730 (Verhoeven). Examples of such phosphorus-containing compounds include phosphoric acid, certain organic phosphorus compounds such as distearylpentaerythritol diphosphite, mono-, di-, and trihydrogen phosphate compounds, or di- and triester phosphate compounds, phosphite compounds, certain inorganic phosphorus compounds such as monosodium phosphate, zinc or calcium phosphates, poly(ethylene)hydrogen phosphate, phosphites and phosphates used in combination with elementary sulfur, silyl phosphates, phosphorus compounds used in combinations with metal sulphides or metal sulphates. U.S. Pat. No. 4,452,933 (Russell) discloses the use of hydroxy- or amino-substituted carboxylic acids such as methyl salicylate, maleic acid, glycine, or dibutyl tartrate to deactivate metal catalyst residues. U.S. Pat. No. 4,452,932 (Brunelle) discloses the use of dehydroacetic acid and a hydroxy-aromatic compounds such as o-hydroxybenzophenone for inactivating metal catalyst residues. It also is known that certain polyols such as mannitol can be used to improve the color of polyester and polycarbonate blends as described in European Patent 0272417 (Nelson).

U.S. Pat. No. 4,619,956 discloses the combination of 2,2,6,6-tetraalkyl-piperidine hindered amine light stabilizers (HALS) and/or their addition salts with triazine ultraviolet absorbers for stabilizing thermoset acrylic and alkyd coatings. U.S. Pat. No. 5,714,530 discloses the utility of combining non-polymeric 2,2,6,6,-tetraalkyl-piperidine HALS salts and/or their acid additon salts with triazine ultraviolet light absorbers for stabilizing certain polymer compositions. U.S. Pat. No. 6,051,164 discloses the use of a polymer stabilizing system comprising from about 50 to about 5,000 ppm of at least one ortho hydroxyl tris-aryl triazine light absorber and from about 500 ppm to about 1.25 percent of at least one oligomer, polymeric or high molecular weight HALS having a molecular weight of at least about 500, wherein the weight ratio of HALS to triazine light absorber is from about 3:1 to about 20:1.

Certain of these phosphorus-containing compounds e.g., phosphoric acid, phosphorous acid, and polyphosphoric acid, can react with processing equipment to produce a dark colored polymer and can lead to the formation of black specks or particles. It is believed that the dark color is the due to corrosion of the process equipment. Addition of strong acids to the polymer compositions also reduces the hydrolytic stability as a result of acid catalyzed hydrolysis. Additionally, phosphite antioxidants can be hydrolyzed to acidic species thereby corroding process equipment or reducing the hydrolytic stability of the polymer composition. It is desirable to provide an additive or mixture of additives that can be used to deactivate metal catalyst residues and other metal impurities and thereby improve the color of polyester-polycarbonate compositions, lead to less corrosion of process equipment, and suppress transesterification.

SUMMARY OF THE INVENTION

We have discovered that the presence of certain salts in polyesters and blends of polyester and polycarbonates result in polymer compositions that exhibit improved hydrolytic stability, that are less detrimental to process equipment, that provide better color, and that provide less batch-to-batch variation in color. The salts useful in the present invention are reaction products of a suitable inorganic acid, such as a phosphorous acid, with a suitable basic organic compound, such as hindered amine light stabilizers (HALS). The present invention provides improved methods for improving the color and avoiding the deleterious effects of transesterification in polyesters and/or polyester-polycarbonate blends.

Thus, the present invention provides a polymer composition comprising:
(A) at least one polyester prepared by the reaction of at least one diol with at least one dicarboxylic acid or dialkyl ester thereof in the presence of a metallic catalyst; and
(B) at least one salt prepared by the reaction of one or more acidic phosphorus-containing compounds with one or more basic organic compounds which contain nitrogen.

A second embodiment of the present invention is a polymer composition comprising:
(A) at least one polyester prepared by the reaction of at least one diol with at least one dicarboxylic acid or dialkyl ester thereof in the presence of a metallic catalyst;
(B) at least one salt prepared from the reaction of one or more acidic phosphorus-containing compounds and one or more basic organic compounds which contain nitrogen; and
(C) at least one polycarbonate.

Another embodiment of the present invention is a polymer concentrate comprising:
(A) at least one polyester prepared by the reaction of at least one diol with at least one dicarboxylic acid or dialkyl ester thereof in the presence of a metallic catalyst; and (B) up to about 10 weight percent, preferably about 5 to 10 weight percent based on the total weight of the polyester of at least one salt prepared by the reaction of one or more acidic phosphorus-containing compounds and one or more basic organic compounds which contain nitrogen.

DETAILED DESCRIPTION OF THE INVENTION

The present invention provides a polymer composition comprising:
(A) at least one polyester prepared by the reaction of at least one diol with at least one dicarboxylic acid or dialkyl ester thereof in the presence of a metallic catalyst; and
(B) a salt prepared by the reaction of one or more acidic phosphorus-containing compounds with one or more basic organic compounds preferably containing nitrogen, wherein the phosphorus-containing compounds are selected from compounds having the formula:

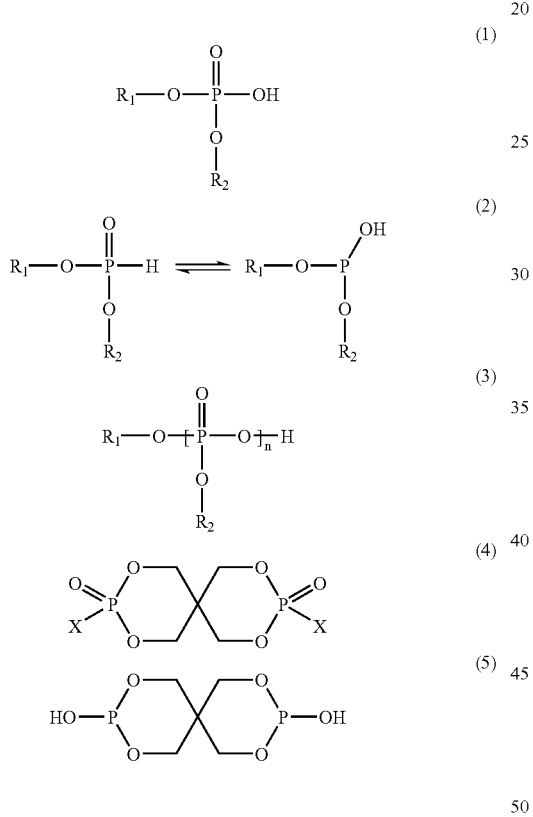

wherein
$R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
n is 2 to 500; and
X is selected from hydrogen and hydroxy;

and wherein the basic organic compounds are selected from compounds having the formulas:

-continued

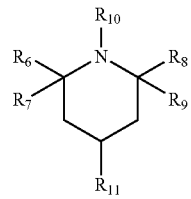

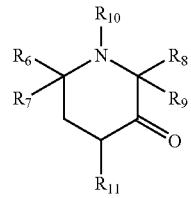

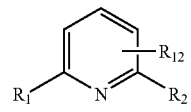

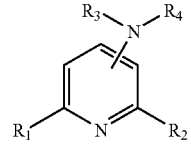

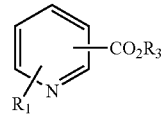

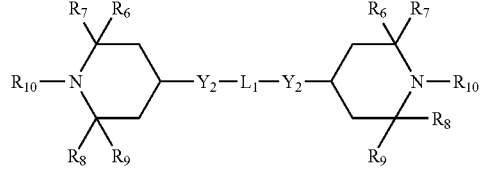

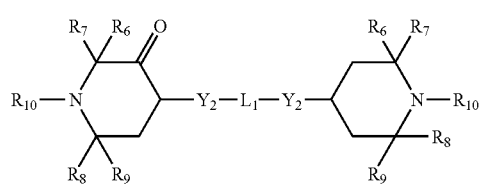

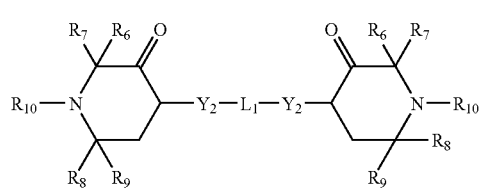

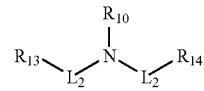

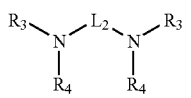

-continued
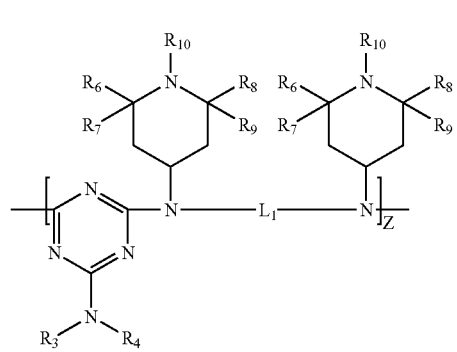(12)
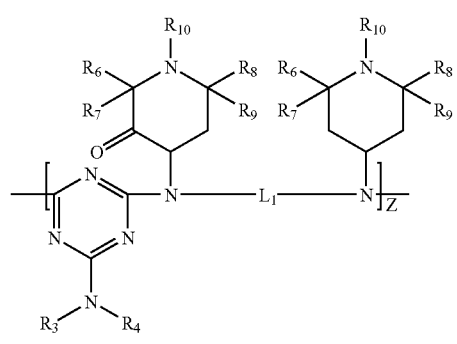(13)
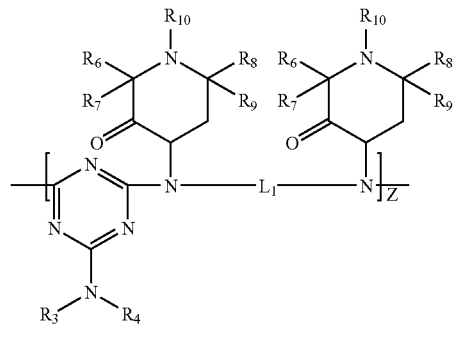(14)
(15)
$$R_1\underset{R_{15}}{\overset{}{N}}-[(CH_2)_{n1}-\underset{}{N}]_{m1}R_2 \quad \overset{R_{16}}{}$$
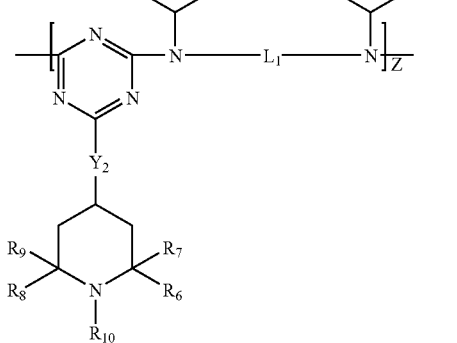(16)
-continued
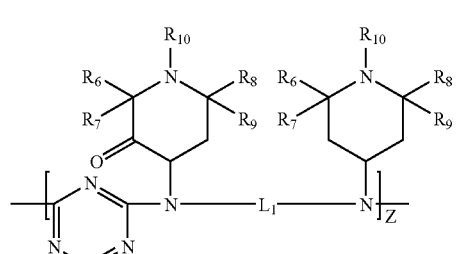(17)
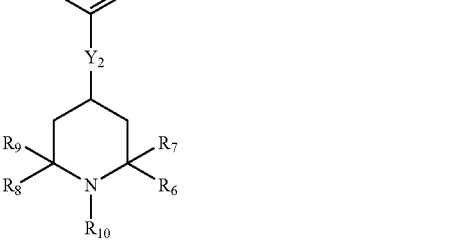(18)
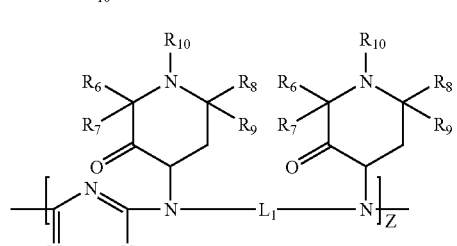(19)
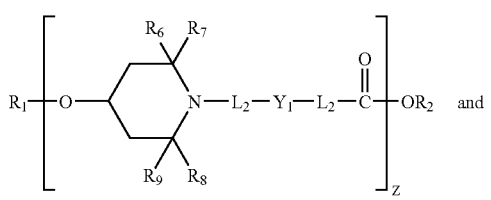(20) and -continued

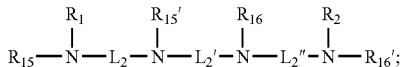

(21)

wherein
- $R_1$ and $R_2$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_3$, $R_4$, and $R_5$ are independently selected from hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$, $R_4$, and $R_5$ is a substituent other than hydrogen; $R_3$ and $R_4$ or $R_4$ and $R_5$ collectively may represent a divalent group forming a ring with the nitrogen atom to which they are attached, e.g., morpholino, piperidino and the like;
- $R_6$, $R_7$, $R_8$, and $R_9$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl;
- $R_{10}$ is selected from hydrogen, —$OR_6$, $C_1$-$C_{22}$-alkyl, substituted $C_1$-$C_{22}$-alkyl, $C_3$-$C_8$-cycloalkyl, substituted $C_3$-$C_8$-cycloalkyl;
- $R_{11}$ is selected from hydrogen; $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_3$ or a succinimido group having the formula

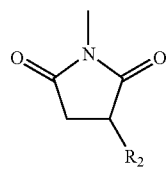

- $R_{12}$ is selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl and may be located at the 2, 3 or 4 positions on the aromatic ring;
- the —$N(R_3)(R_4)$ group may be located at the 2, 3 or 4 positions on the pyridine ring of nitrogen compound (5);
- the —$CO_2R_3$ and $R_1$ groups may be located at any of the 2, 3, 4, 5, 6 positions of the pyridine ring of nitrogen compound (6);
- $L_1$ is a divalent linking group selected from $C_2$-$C_{22}$-alkylene; —$(CH_2CH_2$—$Y_1)_{1-3}$—$CH_2CH_2$—; $C_3$-$C_8$-cycloalkylene; arylene; or —$CO$-$L_2$-$OC$—;
- $L_2$, $L_2'$ and $L_2''$ are independently selected from $C_1$-$C_{22}$-alkylene, arylene, —$(CH_2CH_2$—$Y_1)_{1-3}$—$CH_2CH_2$— and $C_3$-$C_8$-cycloalkylene;
- $Y_1$ is selected from —$OC(O)$—, —$NHC(O)$—, —$O$—, —$S$—, —$N(R_1)$—;
- $Y_2$ is selected from —$O$— or —$N(R_1)$—;
- $R_{13}$ and $R_{14}$ are independently selected from —$O$—$R_2$, and —$N(R_2)_2$;
- Z is a positive integer of up to about 20, preferably up to about 6;
- m1 is selected from 0 to about 10;
- n1 is a positive integer selected from 2 to about 12;
- $R_{15}$, $R_{15}'$, $R_{16}$ are $R_{16}'$ are independently selected from hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, and radical A wherein radical A is selected from the following structures:

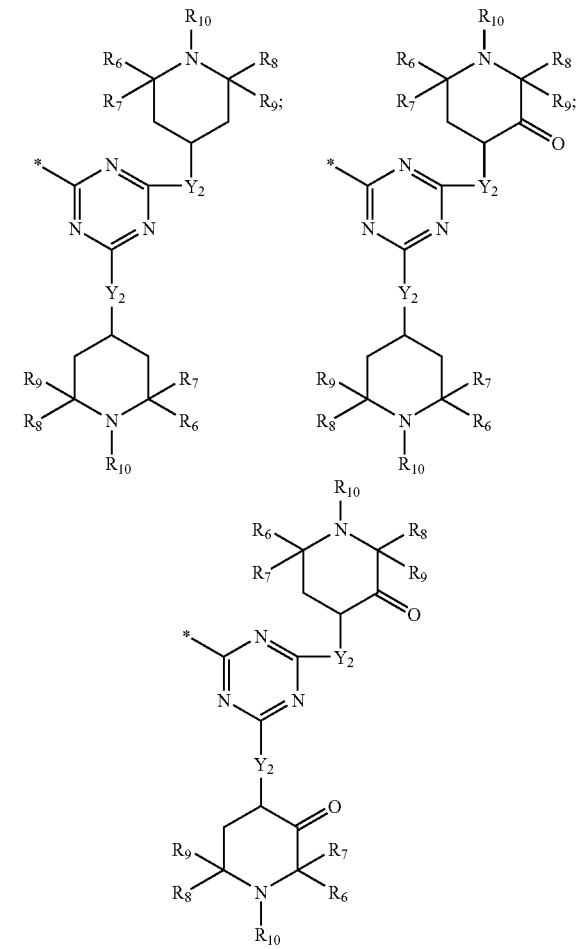

Radical A structures wherein * designates the position of attachment;

preferably at least one of $R_{15}$, $R_{15'}$, $R_{16}$, and $R_{16'}$ is an A radical; and wherein the ratio of the number of phosphorus atoms in the acidic phosphorus-containing compound to the number of basic nitrogen atoms in the basic organic compound is about 0.05 to about 2, preferably from about 0.25 to about 1.1.

The term "$C_1$-$C_{22}$-alkyl" denotes a saturated hydrocarbon radical which contains one to twenty-two carbons and which may be straight or branched-chain. Such $C_1$-$C_{22}$ alkyl groups can be methyl, ethyl, propyl, butyl, pentyl, hexyl, heptyl, octyl, isopropyl, isobutyl, tertbutyl, neopentyl, 2-ethylheptyl, 2-ethylhexyl, and the like. The term "substituted $C_1$-$C_{22}$-alkyl" refers to $C_1$-$C_{22}$-alkyl radicals as described above which may be substituted with one or more substituents selected from hydroxy, halogen, cyano, aryl, heteroaryl, $C_3$-$C_8$-cycloalkyl, substituted $C_3$-$C_8$-cycloalkyl, $C_1$-$C_6$-alkoxy, $C_2$-$C_6$ alkanoyloxy and the like.

The term "$C_3$-$C_8$-cycloalkyl" is used to denote a cycloaliphatic hydrocarbon radical containing three to eight carbon atoms. The term "substituted $C_3$-$C_8$-cycloalkyl" is used to describe a $C_3$-$C_8$-cycloalkyl radical as detailed above containing at least one group selected from $C_1$-$C_6$-alkyl, $C_1$-$C_6$-alkoxy, hydroxy, halogen, and the like.

The term "aryl" is used to denote an aromatic radical containing 6, 10 or 14 carbon atoms in the conjugated aromatic ring structure and these radicals substituted with one or more groups selected from $C_1$-$C_6$-alkyl; $C_1$-$C_6$-alkoxy; phenyl, and phenyl substituted with $C_1$-$C_6$-alkyl; $C_1$-$C_6$-alkoxy; halogen and the like; $C_3$-$C_8$-cycloalkyl; halogen; hydroxy, cyano, trifluoromethyl and the like. Typical aryl groups include phenyl, naphthyl, phenylnaphthyl, anthryl (anthracenyl) and the like. The term "heteroaryl" is used to describe conjugated cyclic radicals containing at least one hetero atom selected from sulfur, oxygen, nitrogen or a combination of these in combination with from two to about ten carbon atoms and these heteroaryl radicals substituted with the groups mentioned above as possible substituents on the aryl radical. Typical heteroaryl radicals include: 2- and 3-furyl, 2- and 3-thienyl, 2- and 3-pyrrolyl, 2-, 3-, and 4-pyridyl, benzothiophen-2-yl; benzothiazol-2-yl, benzoxazol-2-yl, benzimidazol-2-yl, 1,3, 4-oxadiazol-2-yl, 1,3,4-thiadiazol-2-yl, 1,2,4-thiadiazol-5-yl, isothiazol-5-yl, imidazol-2-yl, quinolyl and the like.

The terms "$C_1$-$C_6$-alkoxy" and "$C_2$-$C_6$-alkanoyloxy" are used to represent the groups —O—$C_1$-$C_6$-alkyl and —OCO$C_1$-$C_6$-alkyl, respectively, wherein "$C_1$-$C_6$-alkyl" denotes a saturated hydrocarbon that contains 1-6 carbon atoms, which may be straight or branched-chain, and which may be further substituted with one or more groups selected from halogen, methoxy, ethoxy, phenyl, hydroxy, acetyloxy and propionyloxy. The term "halogen" is used to represent fluorine, chlorine, bromine, and iodine; however, chlorine and bromine are preferred.

The term "$C_2$-$C_{22}$-alkylene" is used to denote a divalent hydrocarbon radical that contains from two to twenty-two carbons and which may be straight or branched chain and which may be substituted with one or more substituents selected from hydroxy, halogen, $C_1$-$C_6$-alkoxy, $C_2$-$C_6$-alkanolyloxy and aryl. The term "$C_3$-$C_8$-cycloalkylene" is used to denote divalent cycloaliphatic radicals containing three to eight carbon atoms and these are optionally substituted with one or more $C_1$-$C_6$-alkyl groups. The term "arylene" is used to denote 1,2-, 1,3-, and 1,4-phenylene radicals and these optionally substituted with $C_1$-$C_6$-alkyl, $C_1$-$C_6$-alkoxy and halogen.

The salt of component (B) of the novel compositions provided by the present invention may be prepared by bringing together the acidic phosphorus-containing compound and the basic nitrogen-containing organic compound in a suitable manner. A suitable manner is any procedure that involves contacting the acidic phosphorus-containing acid with the basic organic compound. For example, the acidic phosphorus-containing compound and the basic nitrogen-containing organic compound may be dissolved in an appropriate solvents and the solutions mixed followed by precipitation of the reaction product; mixing the phosphorus-containing acid and the basic organic compound without solvent; and the like.

The ratio of the number of phosphorus atoms in the acidic phosphorus-containing compound to the number of basic nitrogen atoms in the basic organic compound may be in the range of about 0.05 to about 2, preferably from about 0.25 to about 1.1. Compositions that contain a large excess of unreacted phosphorus-containing acidic compounds may result in corrosion of process equipment during concentrate manufacture and have a negative effect on the hydrolytic stability of the polymer.

The salt or salts constituting component (B) of our novel compositions typically is present in concentrations ranging from about 0.01 to about 0.25 weight percent based on the total weight of the composition, i.e., the total weight of the component (A) polyester, the salt and any additional components present such as a polycarbonate, stabilizers and pigments and colorants. Concentrations of salt (B) within this range typically are effective to improve the color of polyesters and polyester-polycarbonate compositions. Additionally, the color of polyesters that contain UV absorbers and or phenolic antioxidants and polyester-polycarbonate compositions that contain UV absorbers and or phenolic antioxidants is improved. The concentration of the salt(s) preferably is about 0.05 to 0.15 weight percent (same basis). The polyester of component (A) typically contains catalyst metal residues in concentrations of less than about 200 parts per million be weight (ppmw), e.g., about 10 to 200 ppmw. Metal catalyst residues concentrations of about 20 to 100 ppmw are more typical. Corrosion of metal process equipment is an additional source of metal contaminants in polyester component (A). For example, 304 and 316 stainless steels contain manganese, chromium and nickel.

The acidic phosphorus-containing compounds preferably are phosphorous acid, phosphoric acid and polyphosphoric acid, most preferably phosphorous acid.

Examples of suitable basic organic compounds include alkyl amines such as triethylamine and 2,2,6,6-tetramethylpiperidine, pyridine and substituted pyridines, piperidine and substituted piperidines, morpholine and substituted morpholines and the like. The preferred basic organic compounds are hindered amine light stabilizers (HALS) such as: Cyasorb UV-3346 (Cytec Industries, CAS# 90751-07-8), Cyasorb UV-3529 (Cytec Industries, CAS# 193098-40-7), Cyasorb UV-3641 (Cytec Industries, CAS# 106917-30-0), Cyasorb UV-3581 (Cytec Industries, CAS# 79720-19-7), Cyasorb UV-3853 (Cytec Industries, CAS# 167078-06-0), Cyasorb UV-3853S (Cytec Industries, CAS# 24860-22-8), Tinuvin 622 (Ciba Specialty Chemicals, CAS# 65447-77-0), Tinuvin 770 (Ciba Specialty Chemicals, CAS# 52829-07-9), Tinuvin 144 (Ciba Specialty Chemicals, CAS# 63843-89-0), Tinuvin 123 (Ciba Specialty Chemicals, CAS# 129757-67-1), Chimassorb 944 (Ciba Specialty Chemicals, CAS# 71878-19-8), Chimassorb 119 (Ciba Specialty Chemicals, CAS# 106990-43-6), Chimassorb 2020 (Ciba Specialty Chemicals, CAS# 192268-64-7), Lowilite 76 (Great Lakes Chemical Corp., CAS# 41556-26-7), Lowilite 62 (Great Lakes Chemical Corp., CAS# 65447-77-0), Lowilite 94 (Great Lakes Chemical Corp., CAS# 71878-19-8), Uvasil 299LM (Great Lakes Chemical Corp., CAS# 182635-99-0), and Uvasil 299HM (Great Lakes Chemical Corp., CAS# 182635-99-0), Dastib 1082 (Vocht a.s., CAS# 131290-28-3), Uvinul 4049H (BASF Corp., CAS# 109423-00-9), Uvinul 4050H (BASF Corp., CAS# 124172-53-8), Uvinul 5050H (BASF Corp., CAS# 199237-39-3), Mark LA 57 (Asahi Denka Co., Ltd., CAS# 64022-61-3), Mark LA 52 (Asahi Denka Co., Ltd., CAS# 91788-83-9), Mark LA 62 (Asahi Denka Co., Ltd., CAS# 107119-91-5), Mark LA 67 (Asahi Denka Co., Ltd., CAS# 100631-43-4), Mark LA 63 (Asahi Denka Co., Ltd. Co., Ltd. Co., CAS# 115055-30-6), Mark LA 68 (Asahi Denka Co., Ltd., CAS# 100631-44-5), Hostavin N 20 (Clariant Corp., CAS# 95078-42-5), Hostavin N 24 (Clariant Corp., CAS# 85099-51-1, CAS# 85099-50-9), Hostavin N 30 (Clariant Corp., CAS# 78276-66-1), Diacetam-5 (GTPZAB Gigiena Truda, USSR, CAS# 76505-58-3), Uvasorb-HA 88 (3V Sigma, CAS# 136504-96-6), Goodrite UV-3034 (BF Goodrich Chemical Co., CAS# 71029-16-8), Goodrite UV-3150 (BF Goodrich Chemical Co., CAS# 96204-36-3), Goodrite UV-3159 (BF Goodrich Chemical Co., CAS# 130277-45-1), Sanduvor 3050 (Clariant Corp., CAS# 85099-51-0), Sanduvor PR-31 (Clariant Corp., CAS# 147783-69-5), UV Check AM806 (Ferro Corp., CAS# 154636-12-1), Sumisorb TM-061 (Sumitomo Chemical Company, CAS# 84214-94-

8), Sumisorb LS-060 (Sumitomo Chemical Company, CAS# 99473-08-2), Uvasil 299 LM (Great Lakes Chemical Corp., CAS# 164648-93-5), Uvasil 299 HM (Great Lakes Chemical Corp., CAS# 164648-93-5), Nylostab S-EED (Clariant Corp., CAS# 42774-15-2). Additional preferred hindered amine light stabilizer may be listed in the *Plastic Additives Handbook 5th Edition* (Hanser Gardner Publications, Inc., Cincinnati, Ohio, USA, 2001).

The hindered amine light stabilizers having above formulas (2), (3), (7), (8), (9), (12), (13), (14), (15), (16), (17), (18), (19), (20) and (21) represent the preferred basic compounds. Chimassorb 944 (Ciba Specialty Chemicals, CAS# 71878-19-8), Cyasorb UV-3529 (Cytec Industries, CAS# 193098-40-7), Chimassorb 119 (Ciba Specialty Chemicals, CAS# 106990-43-6) and Tinuvin 770 (Ciba Specialty Chemicals, CAS# 52829-07-9) and any equivalents thereof are specific examples of the preferred basic compounds. A more preferred groups of the basic nitrogen compounds are the hindered amine light stabilizers having above formulas (2), (3), (7), (8), (9), (12), (13), (14), (15), (16), (17), (18) and (19) wherein radical R10 is hydrogen or C1-C22 alkyl and formula (15) wherein at least one of R15 and R16 represents radical A wherein R10 is hydrogen or C1-C22 alkyl. The most preferred are high molecular weight HALS wherein the molecular weight is greater than about 1000 such as Cyasorb UV-3529 (Cytec Industries, CAS# 193098-40-7). The most preferred HALS correspond to formula (12) set forth above wherein R6=R7=R8=R9=R10=methyl, (R3)(R4)N— collectively represent morpholino, L1 is C1 to C6 alkylene, and Z is 1 to 6. Additionally, the hindered amine light stabilizers having above formulas (12), (13), (14), (15), (16), (17), (18) and (19) wherein radical R10 is hydrogen or C1-C22 alkyl and formula (15) wherein at least one of R15 and R16 represents radical A wherein R10 is hydrogen or C1-C22 alkyl are particularly preferred for improved hydrolytic stability of polyester, polycarbonate and polyester-polycarbonate composition. Chimassorb 119® is another preferred HALS embodiment. The structure of Chimassorb 119® has previously been disclosed also in the *Journal of Materials Science* 36 (2001) 4419-4431, incorporated herein by reference. The chemical name for Chimassorb 119® as disclosed in the *Journal of Materials Science* 36 (2001) at 4419-4431 is 1,3,5-triazine-2,4,6-triamine, N,N'-1,2-ethane-diyl-bis[[[4,6-bis-[butyl-1,2,2,6,6,-pentamethyl-4-piperidinyl)amino]-1,3,5-triazine-2-yl]amino]-3,1-propanediyl]]bis[N,N"-dibutyl N,N"bis-(1,2,2,6,6,-pentamethyl-4-piperidinyl)-.

The polyester of component (A) includes linear, thermoplastic, crystalline or amorphous polyesters produced by conventional polymerization techniques from one or more diols and one or more dicarboxylic acids or ester-forming equivalent thereof such as a dicarboxylate ester. The polyesters normally are molding or fiber grade and have an inherent viscosity (I.V.) of about 0.4 to about 1.2 dL/g measured at 25° C. in a 60/40 ratio by weight of phenol/tetrachloroethane. Typical polyesters of component (A) comprise:

(1) diacid residues comprising at least 50 mole percent terephthalic acid residues, 1,4-cyclohexanedicarboxylic acid residues or a mixture thereof; and (2) diol residues comprising at least 50 mole percent of ethylene glycol residues, cyclohexanedimethanol residues, or a mixture thereof;

wherein the total of the diacid residues is equal to 100 mole percent and the total of the diol residues also is equal to 100 mole percent. The polyesters of component (A) typically contain up to about 200 ppmw of metal impurity, e.g., 10 to 200 ppmw Ti, Co and/or Mn residues.

The diol residues of the component (A) polyesters may be derived from one or more of the following diols: 2,6-decahydronaphthalenedimethanol, ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-, 1,3- and 1,4-cyclohexanedimethanol, 2,2,4,4-tetramethyl-1,3-cyclobutanediol, bis[4-(2-hydroxyethoxy)phenyl] sulfone, 1,4:3,6-dianhydro-sorbitol, 4,4'-isopropylidenedicyclohexanol, Z-8-bis(hydroxymethyl)-tricyclo-[5.2.1.0]-decane wherein Z represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

The diacid residues of the component (A) polyesters may be derived from a variety of aliphatic, alicyclic, and aromatic dicarboxylic acids. Examples of the dicarboxylic acids from which the diacid residues may be obtained include 2,6-decahydronaphthalenedicarboxylic acid, terephthalic acid, isophthalic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid and the like. The diacid residues may be obtained from the dicarboxylic acid or ester forming derivatives thereof such as esters of the dicarboxylic acid, e.g., dimethyl dicarboxylate esters, acid halides and, in some cases, anhydrides.

One or more branching agents also may be useful in making the polyesters formed within the context of the invention. Although not required, it is preferred that the optional branching agent is present in polyester component (A) in an amount of less than 5 mole percent wherein the total mole percent of the dicarboxylic acid component equals 100 mole percent and the total mole percent of the diol component equals 100 mole percent. The branching agent may provide branching in the acid unit portion of the polyester, or in the glycol unit portion, or it can be a hybrid. Some of these branching agents have already been described herein. However, illustrative of such branching agents are polyfunctional acids, polyfunctional glycols and acid/glycol hybrids. Examples include tri- or tetra-carboxylic acids, such as trimesic acid, pyromellitic acid and lower alkyl esters thereof and the like, and tetrols such as pentaerythritol. Also triols such as trimethylopropane or dihydroxy carboxylic acids and hydroxydicarboxylic acids and derivatives, such as dimethyl hydroxy terephthalate, and the like are useful within the context of this invention. Trimellitic anhydride is a preferred branching agent. The branching agents may be used either to branch the polyester itself or to branch the polyester/polycarbonate blend of the invention.

It is preferred that polyester component (A) comprise about 30 to 100 mole percent 1,4-cyclohexanedimethanol residues wherein the total mole percentages of diol residues of the polyester equals 100 mole percent. In this embodiment, it is also preferred that polyester component (A) comprises 0 to about 70 mole percent ethylene glycol residues. While the diacid residues present in this embodiment may be derived from any diacid, it is preferred that the diacid residues comprise terephthalic acid, isophthalic acid and/or 1,4-cyclohexanedicarboxylic acid residues. When terephthalic acid residues are present, polyester component (A) comprises about 65 to 100 mole percent terephthalic acid residues and about 0 to 35 mole percent isophthalic acid residues.

Thus, one group of preferred polyesters have an inherent viscosity of about 0.4 to 1.2, preferably 0.4 to 0.8, dL/g measured at 25° C. in a 60/40 ratio by weight of phenol/tetrachloroethane and comprise:
(1) diacid residues comprising about 80 to 100 mole percent terephthalic acid residues and about 0 to 20 mole percent isophthalic acid residues; and
(2) diol residues comprising about 40 to 100 mole percent, preferably 55 to 80 mole percent, 1,4-cyclohexanedimethanol residues and 0 to about 60 mole percent, preferably about 20 to 45 mole percent, ethylene glycol residues;

wherein the total of the diacid residues is equal to 100 mole percent and the total of the diol residues also is equal to 100 mole percent.

Another group of preferred polyesters have an inherent viscosity of about 0.4 to 1.2, preferably about 0.4 to 0.8, dL/g measured at 25° C. in a 60/40 ratio by weight of phenol/tetrachloroethane and comprise:
(1) diacid residues comprising about 65 to 82 mole percent, preferably about 70 to 80 mole percent, terephthalic acid residues and about 35 to 18 mole percent, preferably 30 to 20 mole percent, isophthalic acid residues; and
(2) diol residues comprising about 80 to 100 mole percent, preferably 90 to 100 mole percent, 1,4-cyclohexanedimethanol residues and about 0 to about 20 mole percent, preferably 0 to 10 mole percent, ethylene glycol residues;

wherein the total of the diacid residues is equal to 100 mole percent and the total of the diol residues also is equal to 100 mole percent.

Yet another group of preferred polyesters have an inherent viscosity of about 0.4 to 1.2, preferably about 0.4 to 0.8, dL/g measured at 25° C. in a 60/40 ratio by weight of phenol/tetrachloroethane and comprise:
(1) diacid residues comprising at least about 80 to 100 mole percent, preferably 90 to 100 mole percent, and more preferably 100 mole percent 1,4-cyclohexanedicarboxylic acid residues; and
(2) diol residues comprising about 80 to 100 mole percent, preferably 90 to 100 mole percent, most preferably 100 mole percent, 1,4-cyclohexanedimethanol residues and about 0 to about 20 mole percent, preferably 0 to 10 mole percent, most preferably 0 ethylene glycol residues;

wherein the total of the diacid residues is equal to 100 mole percent and the total of the diol residues also is equal to 100 mole percent.

In yet another preferred embodiment, the polyesters have an inherent viscosity of about 0.4 to 1.2, preferably about 0.4 to 0.8, dL/g measured at 25° C. in a 60/40 ratio by weight of phenol/tetrachloroethane and comprise:
(1) diacid residues comprising about 80 to 100 mole percent, more preferably 90 to 100 mole percent terephthalic acid residues and about 0 to 20 mole percent, more preferably 0 to 10 mole percent isophthalic acid residues; and
(2) diol residues comprising about 25 to 37 mole percent, preferably 28 to 34 mole percent, 1,4-cyclohexanedimethanol residues and about 75 to about 63 mole percent, preferably about 72 to 66 mole percent, ethylene glycol residues;

wherein the total of the diacid residues is equal to 100 mole percent and the total of the diol residues also is equal to 100 mole percent.

Even further, another group of preferred polyesters have an inherent viscosity of about 0.4 to 1.2, preferably about 0.5 to 1.0 dL/g measured at 25° C. in a 60/40 ratio by weight of phenol/tetrachloroethane and comprise:

(1) diacid residues comprising terephthalic acid residues from 0.01 to 100 mole percent, preferably at least 40 mole percent; more preferably, 80 to 100 mole percent, and even more preferably from 90 to 100 mole percent, and
(2) diol residues comprising about 52 to 75 mole percent, preferably 52 to 65 mole percent of, 1,4-cyclohexanedimethanol residues and about 25 to 48 mole percent, preferably 35 to 48 mole percent of ethylene glycol residues;

wherein the total of the diacid residues is equal to 100 mole percent and the total of the diol residues also is equal to 100 mole percent. Branching agents are preferred in this embodiment more preferably in the amount of 0.05 to 1.0 mole percent of a trifunctional monomer.

The linear polyesters may be prepared according to polyester-forming procedures and conditions well known in the art. For example, a mixture of one or more dicarboxylic acids, preferably aromatic dicarboxylic acids, or ester forming derivatives thereof, and one or more diols may be heated in the presence of an esterification catalyst and/or polyesterification catalysts at temperatures in the range of about 150 to about 300° C. and pressures in the range of from of atmospheric to about 0.2 Torr. Normally, the dicarboxylic acid or derivative thereof is esterified or transesterified with the diol(s) at atmospheric pressure and at a temperature at the lower end of the specified range. Polycondensation then is affected by increasing the temperature and lowering the pressure while excess diol is removed from the mixture. A preferred temperature range for a polyester condensation is about 260 to about 300° C.

Typical catalyst or catalyst systems for polyester condensation are well known in the art. For example, the catalysts disclosed in U.S. Pat. Nos. 4,025,492; 4,136,089; 4,176,224; 4,238,593; and 4,208,527, incorporated herein by reference, are deemed suitable in this regard. Further, R. E. Wilfong, Journal of Polymer Science, 54 385 (1961) sets forth typical catalysts which are useful in polyester condensation reactions. The most preferred catalysts are complexes of titanium, manganese and cobalt. It is understood that phosphorus-containing compounds can be added in addition to metal catalysts. Polymer compositions that employ antimony or its metal complexes as a catalyst may become unsuitably darkened by adding a phosphorus-containing molecule, such as phosphorous acid or salts of phosphorous acid, e.g., the salts of component (B) of the present invention, during melt blending and extruding.

A second embodiment of the present invention is a polymer composition comprising:
(A) at least one polyester prepared by the reaction of at least one diol with at least one dicarboxylic acid or dialkyl ester thereof in the presence of a metallic catalyst;
(B) at least one salt prepared from the reaction of one or more acidic phosphorus-containing compounds and one or more basic organic compounds which contain nitrogen; and
(C) at least one polycarbonate.

Components (A) and (B) of this embodiment, including the relative amounts thereof, are the same as are described above.

The term "polycarbonate" as used herein embraces those polycarbonates comprising repeating units or residues of the formula

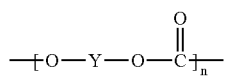

wherein Y is a divalent aromatic or aliphatic radical derived from a dihydroxyaromatic compound or a dihydroxyaliphatic compound of the formula HO—Y—OH. Typical dihydroxyaromatic compounds are 2,2-bis-(4-hydroxyphenyl) propane, also known as bisphenol A; bis(4-hydroxyphenyl) methane; 2,2-bis(4-hydroxy-3-methylphenyl)propane; 4,4-bis(4-hydroxyphenyl)heptane; 2,2-(3,5,3',5'-tetrachloro-4,4'-dihydroxyphenyl)propane; 2,2-(3,5,3',5'-tetrabromo-4,4'-dihydroxyphenol)propane; 3,3'-dichloro-3,3'-dichloro-4,4'-dihydroxydiphenyl)methane; 2,2'-dihydroxyphenylsulfone, and 2,2'-dihydroxylphenylsulfide. Most preferably, HO—Y—OH is 2,2-bis(4-hydroxyphenyl)propyl, in which case, the polycarbonate is a "bisphenol A polycarbonate". Examples of dihydroxyaliphatic compounds include 1,4-cyclohexanedimethanol, 1,2-propanediol, 1,3-propanediol, 1,4-butanediol, 2,2-dimethyl-1,3-propanediol, 1,6-hexanediol, 2,6-decahydronaphthalenedimethanol, 1,2-cyclohexanediol, 1,4-cyclohexanediol, 1,2-cyclohexanedimethanol, 1,3-cyclohexanedimethanol, isosorbide, 4,4'-isopropylidenedicyclohexanol, 2,2,4,4-tetramethylcyclobutane-1,2-diol, Z,8-bis(hydroxymethyl)-tricyclo-[5.2.1.0]-decane wherein Z represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms. Branched polycrbonates are also useful in the present invention.

The polycarbonates comprising component (C) of the above-described embodiment of the present invention may be prepared according to known procedures by reacting the dihydroxyaromatic compound with a carbonate precursor such as phosgene, a haloformate or a carbonate ester, a molecular weight regulator, an acid acceptor and a catalyst. Methods for preparing polycarbonates are known in the art and are described, for example, in U.S. Pat. No. 4,452,933, which is hereby incorporated by reference herein.

Examples of suitable carbonate precursors include carbonyl bromide, carbonyl chloride, and mixtures thereof; diphenyl carbonate; a di(halophenyl)carbonate, e.g., di(trichlorophenyl) carbonate, di(tribromophenyl) carbonate, and the like; di(alkylphenyl)carbonate, e.g., di(tolyl)carbonate; di(naphthyl)carbonate; di(chloronaphthyl)carbonate, or mixtures thereof; and bis-haloformates of dihydric phenols.

Examples of suitable molecular weight regulators include phenol, cyclohexanol, methanol, alkylated phenols, such as octylphenol, para-tertiary-butylphenol, and the like. The preferred molecular weight regulator is phenol or an alkylated phenol.

The acid acceptor may be either an organic or an inorganic acid acceptor. A suitable organic acid acceptor is a tertiary amine and includes such materials as pyridine, triethylamine, dimethylaniline, tributylamine, and the like. The inorganic acid acceptor can be either a hydroxide, a carbonate, a bicarbonate, or a phosphate of an alkali or alkaline earth metal.

The catalysts that can be used are those that typically aid the polymerization of the monomer with phosgene. Suitable catalysts include tertiary amines such as triethylamine, tripropylamine, N,N-dimethylaniline, quanternary ammonium compounds such as, for example, tetraethylammonium bromide, cetyl triethyl ammonium bromide, tetra-n-heptylammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

The polycarbonate of component (C) also may be a copolyestercarbonate such as those described in U.S. Pat. Nos. 3,169,121; 3,207,814; 4,194,038; 4,156,069; 4,430,484, 4,465,820, and 4,981,898, all of which are incorporated by reference herein.

Copolyestercarbonates useful in this invention are available commercially. They are typically obtained by the reaction of at least one dihydroxyaromatic compound with a mixture of phosgene and at least one dicarboxylic acid chloride, especially isophthaloyl chloride, terephthaloyl chloride, or both.

The ratio of polyester component (A) to polycarbonate component (C) is not a critical feature of the present invention, and may be determined by the individual practitioner of this invention. Typically, the weight ratio of polyester (A) to polycarbonate (B) will range from about 99:1 to about 1:99, preferably from about 75:25 to about 25:75, and most preferably is about 75:25 to about 50:50.

The present invention provides polyesters and blends of polyesters and polycarbonates that exhibit improved color. Although not being bound by any particular theory, the improvement in color may be the result of deactivating the metal catalyst residues within the polyester. It is believed that metal catalyst residues, e.g., Ti, Mn and Co residues, may form colored complexes with phenolic moieties such as those found within polycarbonates, within the structure of many ultraviolet light absorbers and all phenolic antioxidants. The acidic phosphorus-containing compound salts of suitable basic organic compounds [Component (B)] may deactivate metal catalyst residues thereby preventing the formation of colored metal-phenol complexes and inhibiting transesterification between the polyester and polycarbonate.

Another embodiment of the present invention is a polymer concentrate comprising:
(A) at least one polyester prepared by the reaction of at least one diol with at least one dicarboxylic acid or dialkyl ester thereof in the presence of a metallic catalyst; and
(B) up to about 10 weight percent, preferably about 5 to 10 weight percent, based on the total weight of the polyester of at least one salt prepared by the reaction of one or more acidic phosphorus-containing compounds and one or more basic organic compounds which contain nitrogen.

The compositions of the present invention also may contain one or more compounds selected from the group consisting of (D) phenolic antioxidants, (E) water, (F) colorants and pigments such as organic colorants, inorganic colorants and or white pigments such as $TiO_2$, ZnO and baryta, (G) other additives such as impact modifiers, plasticizers, halogenated flame-retardants, fillers, nonhalogenated flame-retardants, synergists, processing aids, phosphite stabilizers, phosphonite stabilizers and other stabilizers known to one skilled in the art; and (I) a recycled polymer.

The terms "phenolic antioxidants" and "hindered phenol" are primary antioxidants that are known to those skilled in the art and may be represented by the structures listed on pages 98-108 in the *Plastic Additives Handbook 5th Edition* (Hanser Gardner Publications, Inc., Cincinnati, Ohio, USA, 2001), incorporated herein by reference in its entirety. Some common phenolic antioxidants are as follows: Irganox 1010 (Ciba Specialty Chemicals, CAS# 6683-19-8), Irganox 1330 (Ciba Specialty Chemicals, CAS# 1709-70-2) and Irganox 3114 (Ciba Specialty Chemicals, CAS# 27676-62-6).

The terms "phosphite stabilizers" and "phosphonite stabilizers" refer to secondary antioxidants that are known to those skilled in the art and may be represented by the structures listed on pages 109-112 in the *Plastic Additives Handbook 5th Edition* (Hanser Gardner Publications, Inc., Cincinnati, Ohio, USA, 2001), incorporated herein by reference in its entirety. Some common phosphite stabilizers are as follows: Ultranox 626 (GE Specialty Chemicals, CAS# 26741-53-7), Irgafos 168 (Ciba Specialty Chemicals, CAS# 31570-044), Weston 619 (GE Specialty Chemicals, CAS# 3806-34-6) and Doverphos S-9228 (Dover Chemicals, CAS# 154862-43-8).

The term "halogenated flame-retardants" is defined as compounds that can contain one or more of the following: fluorine, chlorine, bromine, and iodine, which act in such a way as to decrease the flammability of the polymer composition. More preferred are compounds that contain bromine such as brominated polycarbonate, brominated polystyrene, and the like.

The salts of the phosphorus-containing acids and suitable basic organic compounds are believed to substantially deactivate the metallic catalyst residues present in polyester component (A) so that the residues lose their ability to form colored complexes with UV absorbers. Salts of phosphorus-containing acids and basic organic compounds, as defined herein, may reduce the amount of corrosion to process equipment as compared to some of the hydrolysis products of commercial phosphites, phosphorous acid, phosphoric acid, and polyphosphoric acid, thereby improving the color of the polymer composition and improving the lifetime of the process equipment.

The compositions provided by the present invention are useful for improving the properties of heavy-gauge sheet, cap layers for extruded sheet, cap layers for extruded films, thermoformable sheeting products, injection molded products, thin films, thick films, articles made using thin films, articles using from thick films, articles made using heavy gauge sheet, multilayer films, twin-wall sheet, triple-wall sheet and the like.

Sulfuric acid and sulfurous acid also will make salts with the nitrogen-containing compounds disclosed herein that are effective at improving the color of polyester and polyester-polycarbonate compositions that contain UV absorbers and/or phenolic antioxidants. Typically, the improvement in color is not as dramatic as that observed for the salts made using phosphorus-containing acids such as phosphoric acid or phosphorous acid according to the present invention.

This invention is further illustrated by the following examples of preferred embodiments thereof, although it will be understood that these examples are included merely for purposes of illustration and are not intended to limit the scope of the invention unless otherwise specifically indicated. Unless otherwise indicated, all weight percentages are based on the total weight of the polymer composition and all molecular weights are weight average molecular weights. Also, all percentages are by weight unless otherwise indicated. Wherever an R group, L group, Y group, Z group, m group or n group is defined throughout this entire description, the definition for a particular group remains the same throughout this description regardless of whether it is used for multiple formulas or types of compounds unless otherwise specified.

EXAMPLES

Experimental Conditions: All polyester-polycarbonate compositions were made by extruding a 50/50 by weight blend of (1) a polyester comprised of 74 mole percent terephthalic acid residues, 26 mole percent isophthalic acid residues and 100 mole percent 1,4-cyclohexanedimethanol residues having an inherent viscosity of about 0.74 and containing approximately 100 ppmw titanium metal, (2) a bisphenol A polycarbonate supplied by Bayer as Makrolon 2608 polycarbonate and (3) the additive noted using an 18 mm twin-screw extruder (APV Chemical Machinery Inc., Saginaw, Mich. 48601) equipped with a medium mixing screw. All zone temperatures were set to 275° C. except for Zone 1 that was set at 250° C. The inlet port was cooled by circulating water and the screw speed was set to 200 revolution per minute (rpm). An Accu-Rate (ACCU-RATE Inc. Whitewater, Wis.) dry material feeder was used to feed the polymers and additives into the extruder at a set addition rate of 3.0. The extruded rods were cooled by passing through a 1.37 meter (4.5 feet) long ice-water bath then chopped using a Berlyn pelletizer (The Berlyn Corp., Worcester, Mass.) set at a speed of 5-8. All additives were mixed with the polyester and polycarbonate by "bag blending" (shaking the materials together in a bag) unless otherwise stated. The polyester was dried for approximately 24 hours in a vacuum oven (Model 5851, National Appliance Company, Portland, Oreg.) at 70° C. at 120 Torr pressure with a slight ingress of dry nitrogen. The polycarbonate was dried for approximately 24 hours in a vacuum oven (Model 5840, National Appliance Company, Portland, Oreg.) at 100° C. at 120 Torr with a slight ingress of dry nitrogen. Concentrates were prepared from the blend of polymers and the additives and then dried under the same conditions as the polyester was dried. All of the polymers were stored in a vacuum oven under nitrogen until about 5 minutes prior to use, then "bag blended" and added to the feeder. The first 5 minutes of extrudate was not collected in order to ensure the extruder had been adequately purged. When multiple concentrations of the same mixture of additives were extruded, the lower concentrations of additives always were extruded first. The extruder was purged with at least 300 g of a 1:1 mixture of the polyester/polycarbonate blend before the next additive was evaluated. When water was used as an additive, the water was added to the dried polymer pellets, along with any other additive(s), about 3 hours prior to extruding.

The color of the polymer pellets is determined in a conventional manner using a HunterLab UltraScan Colorimeter manufactured by Hunter Associates Laboratory, Inc., Reston, Va. The instrument is operated using HunterLab Universal Software (version 3.8). Calibration and operation of the instrument is according to the HunterLab User Manual and is largely directed by the Universal Software. To reproduce the results on any colorimeter, run the instrument according to its instructions and use the following testing parameters: D65 Light Source (daylight, 6500° K color temperature), Reflectance Mode, Large Area View, Specular Included, CIE 10° Observer, Outputs are CIE L*, a*, b*. The pellets are placed in a holder that is 25 mm deep by 55 mm wide and high. The holder is black with a window on one side. During testing, the clear side of the holder is held at the reflectance port of the calorimeter as is normally done when testing in reflectance mode. An increase in the positive b* value indicates yellowness, while a decrease in the numerical value of b* indicates a reduction in yellowness. Color measurement and practice are discussed in greater detail in Anni Berger-Schunn in *Practical Color Measurement*, Wiley, NY pages 39-56 and 91-98 (1994). Preferably, the b* value is less than +4, more preferably from about +1 to about +2.

The molecular weight of the polyester and polycarbonate fractions, in the polyester-polycarbonate compositions, was determined using gel permeation chromatography. The sample was analyzed separately for each component of the blend. Each sample was prepared and analyzed once using the polyester method and then prepared and analyzed using the polycarbonate method.

Polyester Method: Ten mg of sample was added to a 10 mL volumetric flask followed by 20 microliters of toluene (as a flow marker) then diluted to a volume of 10 mL with an azeotrope of methylene chloride and hexafluoroisopropanol. A stir bar was added and the mixture was stirred on a stir plate until completely dissolved. The sample was analyzed using a Perkin-Elmer series 200 LC binary pump at a flow rate of 1.0 mL/minute, with a Perkin-Elmer ISS 200 Autosampler using a 10 microliter injection loop. The detector was a Perkin-Elmer LC-95 UV/Vis detector set at 285 nm. The columns are Plgel 5 micron guard and a Mixed C from Polymer Laboratories. The polystyrene calibration consists of 15 narrow molecular weight polystyrene standards from Polymer Laboratories ranging from 162 to 3,220,000. The universal calibration parameters were: PS, K=0.1278, a=0.7089; PCT K=0.2357, a=0.8405. The universal calibration parameters were determined by linear regression to yield the correct weight average molecular weight for a set of five PCT samples previously characterized by light scattering.

Polycarbonate Method: The sample was pressed until it turned white to increase the surface area and then allowed to soak in tetrahydrofuran (THF) solvent to leach out the polycarbonate from the sample. Ten mg of sample was added to a 10 mL volumetric flask followed by 20 microliters of toluene (as a flow marker) then diluted to a volume of 10 mL with unstabilized THF. A stir bar was added and the mixture was stirred on a stir plate overnight. The sample was analyzed using a Perkin-Elmer LC 250 binary pump at a flow rate of 1.0 mL/min., with a Perkin-Elmer LC 600 Autosampler using a 20 microliter injection loop. The detector was a Perkin-Elmer LC-235 photodiode array detector set at 265 nm. The columns are Plgel 5 micron guard, a Mixed C from Polymer Laboratories and an Oligopore column from Polymer Laboratories. The polystyrene calibration consists of 15 narrow molecular weight polystyrene standards from Polymer Laboratories ranging from 162 to 3,220,000. The universal calibration parameters were: PS, K=14.000, a=0.7000; PC K=39.900, a=0.7000. The universal calibration parameters for polycarbonate in THF were obtained from the literature.

Examples 1-12 and Comparative Examples 1 and 2

Chimassorb 944 hindered amine light stabilizer and phosphorous acid of Examples 1-12 of Table I were ground together using a mortar and pestle until a fine powder was obtained. Varying amounts of the resulting amine-phosphorous acid salt were blended with the polymers consisting of 350 g polyester and 350 g polycarbonate as described above. Chimassorb 944 is believed to be a polymeric, hindered amine conforming generally to amine formula (12) set forth above wherein $R_6=R_7=R_8=R_9$=methyl; $R_{10}$ is hydrogen; $L_1$ is hexamethylene; $R_3$ is hydrogen; and $R_4$ is a branched octyl group. Table I shows the b* value as measured on pellets extruded from the 50/50 by weight blend of polyester and polycarbonate containing various concentrations of Chimassorb 944, phosphorous acid, and water. Salts made from Chimassorb 944 and phosphorous acid may have varying ratios of phosphorous acid to Chimassorb 944 to improve the catalyst deactivation ability and improve the color of polyester-polycarbonate compositions. In Table I the amounts of Chimassorb 944 and phosphorous acid are given in grams and the amount of water is given in milligrams.

TABLE I

| Example | Chimassorb 944 | Phosphorus Acid | Water | b* | Polycarbonate MW |
|---|---|---|---|---|---|
| C-1 | 0.7 | — | — | 22.37 | 13,347 |
| 1 | 0.7 | 0.096 | — | 10.42 | 12,236 |
| 2 | 0.7 | 0.192 | — | 5.11 | 19,026 |
| 3 | 0.7 | 0.288 | — | 3.69 | 21,648 |
| 4 | 0.7 | 0.383 | — | 3.29 | 19,747 |
| C-2 | 3.5 | — | — | 22.43 | 16,643 |
| 5 | 3.5 | 0.479 | — | 3.62 | 15,776 |
| 6 | 3.5 | 0.958 | — | 3.39 | 15,623 |
| 7 | 3.5 | 1.438 | — | 3.0 | 15,800 |
| 8 | 3.5 | 1.916 | — | 2.96 | 16,611 |
| 9 | 0.7 | 0.096 | 21 | 5.24 | 21,879 |
| 10 | 3.5 | 0.192 | 42 | 2.31 | 20,001 |
| 11 | 0.7 | 0.288 | 63 | 2.0 | 19,466 |
| 12 | 0.7 | 0.383 | 84 | 1.87 | 19,795 |

As is shown by the data in Table I, high concentrations of Chimassorb 944 and phosphorous acid salt (Examples 5-8) significantly reduce the b* color but had a negative effect on the polycarbonate molecular weight (MW). Lesser amount of salt (Examples 1-4) allowed for an equivalent reduction in b* color without having a significant impact on the polycarbonate molecular weight. The addition of a small amount of water (Examples 9-12) greatly reduced the b* color with only a slight negative effect on polycarbonate molecular weight relative to the examples with equivalents amount of salt. A salt comprising about 0.02 to 0.3 weight percent phosphorous acid and 0.05 to about 0.5 weight percent Chimassorb 944 provided a suitable reduction in the pellet b* color without significantly reducing the polycarbonate molecular weight. Addition of low levels of water (Examples 9-12), from about 30 ppm to about 300 ppm, provided a further reduction in pellet b* color without having a significant impact on the polycarbonate molecular weight. Maintenance of the polycarbonate molecular weight (Mw) demonstrates that catalyst residues have been sufficiently deactivated. Comparative Examples C-1 and C-2 show that Chimassorb 944 is not effective for either reducing pellet b* value or deactivating catalyst residues, as can be seen by the loss of polycarbonate molecular weight (Mw) and large pellet b* color values.

Examples 13-16 and Comparative Example 3

Chimassorb 944 hindered amine (7.0 g) and phosphorous acid (2.88 g) were ground together to give a fine powder and bag blended with 700 g of polyester and 700 g of polycarbonate. The mixture was melt processed to give a salt concentrate (Conc). Varying amounts of the salt concentrate were incorporated into a 50/50 weight percent blend of polyester and polycarbonate. The blends evaluated and the results of the evaluations are shown in Table II. In Comparative Example C-3 and Example 13 the polymer blend consisted of 300 g of polyester and 300 g of polycarbonate; in Examples 14 and 15, the polymer blend consisted of 250 g of polyester and 250 g of polycarbonate; and in Example 16 the polymer blend consisted of 250 g of polyester and 250 g of polycarbonate. In Table II, the amounts of concentrate (Conc) are given in grams and Salt values refer to the weight percent concentration of the salt in the polymer blend (based on the total weight of the polymer composition) provided by the concentrate.

TABLE II

| Example | Conc | Salt Weight percent | b* | Polycarbonate MW |
|---|---|---|---|---|
| C-3 | — | — | 21.26 | 14,200 |
| 13 | 200 | 0.18 | 2.99 | 19,050 |
| 14 | 100 | 0.12 | 2.41 | 20,860 |
| 15 | 50 | 0.064 | 2.94 | 21,660 |
| 16 | 50 | 0.44 | 5.15 | 21,943 |

The data presented in Table II establish that the salt has a dramatic effect on pellet b* color along with polycarbonate MW (Comparative Example 3 vs Example 16). The data demonstrate that between 0.06 and 0.18 weight percent salt can be used to effectively reduce pellet b* color. The data also show that between 0.06 and 0.18 weight percent salt provides a good pellet b* value without significantly reducing the molecular weight of the polycarbonate.

Examples 17-25 and Comparative Example 4

Varying amounts of Tinuvin 770 hindered amine light stabilizer and phosphorus acid were ground together using a mortar and pestle to produce a phosphorous acid salt of Tinuvin 770 hindered amine as a fine white powder that was bag blended with polyester and polycarbonate. Tinuvin 770 is a hindered amine light stabilizer believed to conform generally to the compounds of amine formula (7) set forth above wherein $R_6=R_7=R_8=R_9$=methyl; $R_{10}$ is hydrogen; $Y_2$ is —OCO—; and $L_1$ is octamethylene. The compositions were extruded and evaluated as described above. The results are shown in Table III. The polymer blend for the examples of Table III consisted of 175 g polyester and 175 g of polycarbonate. The values given for Tinuvin 770 and phosphorous acid (Phos Acid) are concentrations in mg and (weight percent) in the polymer blend.

The data reported in Table III show that the phosphorous acid salts of Tinuvin 770 hindered amine were effective at suppressing transesterification and improving the pellet b* color. The weight percent phosphorous acid added was established by altering the mole ratio of phosphorous acid to the number of nitrogen atoms in Tinuvin 770. Data in Table III show a good balance of color of the composition and maintenance of polycarbonate molecular weight ($M_w$) can be obtained by using a 1:1 mole ratio of Tinuvin 770 and phosphorous acid using 0.1 weight percent salt. At a concentration of 0.05 weight percent loading, the mole ratio of phosphorous acid to Tinuvin 770 can be increased to 2.0. It is apparent from these data that the Tinuvin 770 salt is quite effective at improving the color of polyesters-polycarbonate blends. The Tinuvin 770 salt also is effective at reducing the amount of transesterification that occurs between the polyester and polycarbonate during melt processing.

Examples 26-45 and Comparative Examples 5-8

The procedure of Examples 17-25 was repeated using varying amounts of Lowilite 62, Lowilite 76 and Chimassorb 119 hindered amine light stabilizer and phosphorous acid to produce a variety of phosphorous acid salts of the hindered amines. Lowilite 62 is a hindered amine light stabilizer believed to conform generally to the compounds of amine formula (20) set forth above wherein $R_1$ is hydrogen; $R_2=R_6=R_7=R_8=R_9$=methyl; $L_2$ is ethylene; and $Y_1$ is —OCO—. Lowilite 76 is a hindered amine light stabilizer believed to conform generally to the compounds of amine formula (7) set forth above wherein $R_6=R_7=R_8=R_9=R_{10}$=methyl; $Y_2$ is —O—; and $L_1$ is —CO—$(CH_2)_8$—CO—. The chemical name for Chimassorb 119® as disclosed in the *Journal of Materials Science* 36 (2001) at 4419-4431 is 1,3,5-triazine-2,4,6-triamine, N,N'-1,2-ethane-diyl-bis[[[4,6-bis-[butyl-1,2,2,6,6,-pentamethyl-4-piperidinyl)amino]-1,3,5-triazine-2-yl]amino]-3,1-propanediyl]]bis[N,N''-dibutyl N,N''bis-(1,2,2,6,6,-pentamethyl-4-piperidinyl)-. The compositions were extruded and evaluated as described above. The results are shown in Table IV. The polymer blend for the examples of Table IV consisted of 175 g polyester and 175 g of polycarbonate. The values given for Lowilite 62; Lowilite 76, Chimassorb 119 (Chimab 119) and phosphorous acid (Phos Acid) are concentrations in mg in the polymer blend.

TABLE III

| | | | | | | Polycarbonate Fraction | | |
|---|---|---|---|---|---|---|---|---|
| Example | Tinuvin 770 | Phos Acid | a* | b* | L* | Mn | Mw | Mz |
| C-4 | 350 (0.1) | | 8.44 | 20.83 | 58.52 | 6,367 | 17,968 | 30,477 |
| 17 | 175 (0.05) | 45 (0.013) | −0.26 | 7.66 | 70.15 | 7,917 | 23,320 | 39,171 |
| 18 | 175 (0.05) | 60 (0.017) | −0.43 | 3.47 | 71.33 | 7,746 | 22,778 | 38,325 |
| 19 | 175 (0.05) | 75 (0.021) | −0.23 | 4.56 | 71.24 | 7,378 | 22,638 | 38,624 |
| 20 | 175 (0.05) | 140 (0.04) | −0.28 | 3.22 | 71.12 | 7,149 | 21,325 | 36,239 |
| 21 | 350 (0.1) | 30 (0.0085) | −0.44 | 4.73 | 70.32 | 7,218 | 22,772 | 39,040 |
| 22 | 350 (0.1) | 60 (0.017) | −0.34 | 3.46 | 71.43 | 7,497 | 22,066 | 37,003 |
| 23 | 350 (0.1) | 90 (0.026) | −0.34 | 3.08 | 70.78 | 7,075 | 21,252 | 36,169 |
| 24 | 350 (0.1) | 119 (0.034) | −0.34 | 3.26 | 71.26 | 6,932 | 20,289 | 34,332 |
| 25 | 350 (0.1) | 149 (0.043) | −0.33 | 2.89 | 71.55 | 6,540 | 18,417 | 30,947 |

TABLE IV

| Example | Lowilite 62 | Lowilite 76 | Chimab 119 | Phos Acid | a* | b* | L* | Polycarbonate Fraction Mn | Mw | Mz |
|---|---|---|---|---|---|---|---|---|---|---|
| C-5 | — | — | — | — | 6.26 | 19.75 | 60.74 | 5,768 | 17,005 | 29,492 |
| C-6 | 350 | — | — | — | 6.48 | 20.54 | 61.54 | 6,195 | 18,015 | 30,721 |
| 26 | 350 | — | — | 51 | 0.06 | 8.87 | 69.23 | 7,167 | 22,634 | 38,663 |
| 27 | 350 | — | — | 102 | −0.05 | 5.84 | 70.27 | 7,462 | 22,609 | 38,274 |
| 28 | 350 | — | — | 153 | 0.32 | 6.32 | 69 | 7,409 | 21,541 | 36,178 |
| C-7 | — | 350 | — | — | 8.31 | 21.44 | 60.34 | 6,502 | 18,645 | 31,740 |
| 29 | — | 175 | — | 42.5 | 0.3 | 7.15 | 69.88 | 7,234 | 22,607 | 38,592 |
| 30 | — | 175 | — | 56.5 | −0.06 | 5.1 | 70.71 | 7,388 | 22,603 | 38,363 |
| 31 | — | 175 | — | 71 | −0.02 | 4.93 | 70.37 | 7071 | 22,912 | 35,437 |
| 32 | — | 175 | — | 140 | 0.12 | 5.24 | 70.25 | 6,694 | 19,111 | 32,319 |
| 33 | — | 350 | — | 28.3 | −0.01 | 7.89 | 69.63 | 7,454 | 22,895 | 38,772 |
| 34 | — | 350 | — | 56.5 | 0.12 | 6.07 | 69.77 | 7,334 | 21,700 | 36,799 |
| 35 | — | 350 | — | 85 | 0.13 | 5.84 | 70.41 | 7,072 | 20,145 | 33,822 |
| 36 | — | 350 | — | 113 | 0.24 | 5.57 | 69.88 | 6,522 | 19,541 | 33,648 |
| 37 | — | 350 | — | 142 | 0.32 | 5.69 | 69.67 | 6,127 | 17,054 | 28,974 |
| C-8 | — | — | 350 | — | 4.23 | 19.94 | 62.91 | 6,551 | 18,841 | 32,028 |
| 38 | — | — | 350 | 37.5 | −0.77 | 11.62 | 69.1 | 7,325 | 21,368 | 36,005 |
| 39 | — | — | 350 | 50 | −0.82 | 12.38 | 68.97 | 7,337 | 21,113 | 35,575 |
| 40 | — | — | 350 | 63 | −1.09 | 9.83 | 69.76 | 7,148 | 20,707 | 34,638 |
| 41 | — | — | 350 | 75.5 | −1.01 | 8.48 | 70.42 | 7,065 | 20,279 | 34,201 |
| 42 | — | — | 350 | 88 | −0.87 | 8.19 | 70.21 | 6,867 | 19,861 | 33,502 |
| 43 | — | — | 350 | 101 | −0.74 | 7.74 | 70.11 | 7,009 | 19,824 | 33,507 |
| 44 | — | — | 350 | 113 | −0.73 | 6.99 | 70.29 | 6,799 | 19,249 | 32,554 |
| 45 | — | — | 350 | 140 | −0.79 | 6.62 | 71.07 | 6,136 | 17,534 | 29,933 |

The data presented in Table IV show that the phosphorous acid salts of hindered amine light stabilizers are effective at improving the pellet b* color of polyester-polycarbonate blends relative to blends that do not contain the stabilizer. In Examples 26-45, several phosphorous acid salt compositions were evaluated at concentrations of 0.05 weight percent and/or 0.1 weight percent. It is clear that the pellet b* color is greatly affected by the salt composition that is selected and may be optimized for each hindered amine light stabilizer or other basic organic compound employed. In comparing the data of Table III with the data of Table IV, it is clear that the phosphorous acid salts of Tinuvin 770 are more effective at improving the pellet b* color. The phosphorous acid salts of Tinuvin 770, Lowilite 62, Lowilite 76 and Chimassorb 119 did not create haze in any of the polyester-polycarbonate alloys that were evaluated.

Generally, the amount of salt required to achieve acceptable color and molecular weight properties decreases as the ratio of the moles of phosphorous acid to the moles of basic nitrogen atoms in the hindered amine lights stabilizer approaches one. If more than one mole of phosphorous acid per mole of basic nitrogen atoms in the basic organic compound is used, some unsalted phosphorous acid will be present and may lead to corrosion of process equipment.

Example 46 and Comparative Example C-9

Preparation of Salt 1

To a clean, dry, 5-L, round-bottomed flask equipped with a mechanical stir bar, thermocouple, and a heating mantle was added 411.76 g of Cyasorb UV-3529 and 945 g of toluene. Cyasorb UV-3529 is a polymeric hindered amine light stabilizer believed to conform generally to the compounds of amine formula (12) set forth above $R_6=R_7=R_8=R_9=R_{10}$=methyl; $L_1$ is hexamethylene; and $(R_3)(R_4)N$— collectively represent a morpholino group. The slurry was heated to 60° C. and stirred until a homogeneous solution was obtained. Isopropyl alcohol (370 g) was added to the reaction vessel. A solution of 115.46 g (1.41 mol) of phosphorous acid dissolved into 370 g of isopropyl alcohol was added slowly over approximately 1 hour. A homogeneous solution was obtained. The reaction mixture was pumped into an 18 L reaction vessel that contained rapidly stirred heptane (6840 g) over a period of approximately 1 hour. The resulting slurry was stirred for 30 minutes. The precipitate was collected by suction filtration. The filter cake was washed twice with 137 g of heptane then sucked dry on the filter paper overnight. The solid was placed in a 30.5 cm×15.2×5.1 (12 inch×6 inch×2 inch) metal pan and dried in a vacuum oven at 50-60° C. with a slight ingress of dry nitrogen until a constant mass was obtained. The dry product (Salt 1) weighed approximately 525 g (100 percent of theory).

The salt of Cyasorb UV-3529 (0.5013, 0.1 weight percent) and phosphorous acid thus prepared was incorporated into a polymer blend consisting of 249.5 g of each of polyester and polycarbonate. The polymer was converted to pellets as described above and and the pellets were compared to pellets prepared from a polymer blend consisting of 250 g of each of polyester and polycarbonate but no salt, Cyasorb UV-3529 or phosphorous acid. The results of the evaluation are shown in Table V.

TABLE V

| Example | L* | a* | b* |
|---|---|---|---|
| C-9 | 56.38 | 8.17 | 18.76 |
| 46 | 69.65 | −0.35 | 3.12 |

Cyasorb UV-3529 is a polymeric hindered amine light stabilizer that may exhibit superior performance than lower molecular weight hindered amine light stabilizers, such as Tinuvin 770. The phosphorous acid salts of Cyasorb UV-3529 also exhibit very low haze in polyester-polycarbonate alloys. At 0.1 wt percent loading in a 50/50 weight percent blend of polyester and polycarbonate, the salt of Cyasorb UV-3529 provided a polymer alloy that had a pellet color that was as good as the phosphorous acid salts of Tinuvin 770 (Example 46 vs. Examples 17-25).

Examples 47-51

Preparation of Salts 2-6

A 50 percent phosphoric acid solution was prepared by adding 35.15 g of 85 percent phosphoric acid to 24.87 g of deionized water. A sample of Chimassorb 944 was ground to a fine powder using a mortar and pestle. The ground Chimassorb 944 and 50 percent phosphoric acid solution were mixed using a spatula in the ratios listed in Table VI to prepare each salt. The salts were dried overnight in a vacuum oven at 70° C. at about 15 Torr and a slight ingress of dry nitrogen for 24 hours. Each sample was ground using a mortar and pestle and dried under the same conditions as before for 48 hours. Each sample was ground to a fine, free flowing powder using a mortar and pestle.

TABLE VI

|  | Chimassorb 944 | 50 percent phosphoric acid$_{(aq)}$ |
|---|---|---|
| Salt 2 | 10 g | 6.54 g |
| Salt 3 | 10 g | 8.18 g |
| Salt 4 | 10 g | 9.82 g |
| Salt 5 | 10 g | 11.45 g |
| Salt 6 | 10 g | 13.05 g |

Each salt (0.5 g, 0.1 wt percent) was bag blended with 250 g of polyester and 250 g of polycarbonate. The mixture was extruded under standard conditions and the pellet color and polycarbonate molecular weight (Mw) were measured using standard conditions as described above. The results of the evaluation are shown in Table VII.

TABLE VII

| Example | Salt | a* | b* | L* | Polycarbonate | | |
|---|---|---|---|---|---|---|---|
|  |  |  |  |  | Mn | Mw | Mz |
| 47 | 2 | −0.37 | 4.31 | 72.12 | 7,630 | 22,097 | 37,601 |
| 48 | 3 | −0.31 | 4.29 | 72.25 | 7,234 | 21,573 | 36,379 |
| 49 | 4 | −0.08 | 5.69 | 71.99 | 7,436 | 22,017 | 37,234 |
| 50 | 5 | −0.37 | 4.9 | 72.25 | 7,444 | 22,612 | 38,410 |
| 51 | 6 | −0.34 | 3.97 | 72.57 | 7,363 | 22,646 | 38,493 |

The data presented in Table VII show that the phosphoric acid salts of Chimassorb 944 are effective at improving the color and suppressing transesterification of a polyester-polycarbonate blend.

Examples 52 and 53

Preparation of Salt 7

To a 50 mL beaker was added 5.18 g of phosphorous acid and 5.0 g of pyridine. A solid material formed. The solid material (Salt 7) was triturated with a glass rod until a finely divided solid remained. In Example 52, Salt 7 (350 mg, 0.05 weight percent) was bag blended with 350 g of polyester and 350 g of polycarbonate. The mixture was extruded using the procedures described above and the pellet color and polycarbonate molecular weight (Mw) were measured using the above-desribed procedures. In Example 53, Salt 7 (700 mg, 0.1 weight percent) was bag blended with 350 g of polyester and 350 g of polycarbonate. The mixture was extruded and pelletized and the pellet color and polycarbonate molecular weight (Mw) were measured using the above-described procedures. The results of the evaluation are shown in Table VIII.

TABLE VIII

| Example | a* | b* | L* | Polycarbonate | | |
|---|---|---|---|---|---|---|
|  |  |  |  | Mn | Mw | Mz |
| 52 | −0.38 | 6.82 | 68.91 | 7,800 | 23,067 | 38,175 |
| 53 | −0.15 | 4.31 | 69.94 | 7,408 | 21,118 | 34,892 |

The data reported in Table VIII demonstrates that the phosphorous acid salts of aromatic nitrogen-containing compounds are effective at improving the color and suppression of transesterification in polyester-polycarbonate blends (Comparative Example C-9 vs. Examples 52 and 53).

Examples 54 and 57

Preparation of Salt 8 and 9

To a 50 mL beaker was added 4.05 g of phosphorous acid and 5.0 g of triethylamine. A waxy material formed. The material was triturated with a glass rod until no triethylamine was visible to produce Salt 8. To a 50 mL beaker was added 4.05 g of phosphorous acid and 5.0 g of diisopropylamine. A waxy material formed. The material was triturated with a glass rod until no diisopropylamine was visible to provide Salt 9.

Example 54: Salt 8 (350 mg, 0.05 weight percent) was bag blended with 175 g of polyester and 175 g of polycarbonate. The mixture was extruded and pelletized and the pellet color and polycarbonate molecular weight (Mw) were measured using the above-described procedures. Example 55: Salt 8 (700 mg, 0.1 weight percent) was bag blended with 175 g of polyester and 175 g of polycarbonate. The mixture was extruded and pelletized and the pellet color and polycarbonate molecular weight (Mw) were measured using the above-described procedures. Example 56: Salt 9 (350 mg, 0.05 weight percent) was bag blended with 175 g of polyester and 175 g of polycarbonate. The mixture was extruded and pelletized and the pellet color and polycarbonate molecular weight (Mw) were measured using the above-described procedures. Example 57: Salt 9 (700 mg, 0.1 wt percent) was bag blended with 175 g of polyester and 175 g of polycarbonate. The mixture was extruded and pelletized and the pellet color and polycarbonate molecular weight (Mw) were measured using the above-described procedures. The results of the evaluations of Salts 8 and 9 are set forth in Table IX.

TABLE IX

| Example | Salt | a* | b* | L* | Polycarbonate | | |
|---|---|---|---|---|---|---|---|
|  |  |  |  |  | Mn | Mw | Mz |
| 54 | 8 | −0.4 | 6.09 | 70.46 | 6432 | 18157 | 30712 |
| 55 | 8 | −0.18 | 5.69 | 69.18 | 5670 | 15619 | 26697 |
| 56 | 9 | −0.38 | 7.11 | 70.29 | 7148 | 20575 | 34652 |
| 57 | 9 | −0.52 | 5.74 | 71.46 | 6123 | 16827 | 28534 |

The data in Table IX demonstrate that the phosphorous acid salts of aliphatic nitrogen-containing compounds are effective for improving the color and suppression of transesterification in polyester-polycarbonate blends (Example C-9 vs. Examples 54-57).

Comparative Examples 10-16

The additives listed below were blended in the amounts given (Amount, g) with individual polymer blends consisting of 350 g polyester and 350 g polycarbonate:

| Additive No. | Additive | Amount |
|---|---|---|
| 1 | Calcium Dihydrogen Phosphate | 1.4 |
| 2 | D-mannitol | 1.05 |
| 3 | Citric Acid | 1.4 |
| 4 | Zinc Sulfate Monohydrate | 7.0 |
| 5 | Irgafos PEPQ FD-Ciba-Geigy | 7.0 |
| 6 | 45 percent Aqueous Sulfuric Acid | 0.77 |
| 7 | 3,9-Bis(octadecyloxy)-2,4,8,10-tetraoxa-3,9-diphosphaspiro[5.5]undecane | 1.4 |
| 8 | Phosphorous Acid | 0.375 |

The blends were extruded and pelletized and the pellet color was measured using the above-described procedures. The results of the evaluations of Additives 1-8 are set forth in Table X.

TABLE X

| Example | Additive No. | b* | L* |
|---|---|---|---|
| C-10 | 1 | 4.05 | 68.58 |
| C-11 | 2 | 7.78 | 68.33 |
| C-12 | 4 | 16.63 | 59.75 |
| C-13 | 3 and 5 | 8.29 | 70.83 |
| C-14 | 6 | 8.42 | 67.08 |
| C-15 | 7 | 6.02 | 71.35 |
| C-16 | 8 | 6.68 | 67.4 |

The amounts of each additive that were used to prepare polyester-polycarbonate compositions are similar to the amounts disclosed in the prior art. The data presented in Table X establish that the phosphorous acid salts of some basic organic compounds, such as hindered amine light stabilizers, are more effective at improving the color of polyester-polycarbonate blends than are additives described in the prior art.

The invention has been described in detail with particular reference to preferred embodiments thereof, but it will be understood that variations and modifications can be effected within the spirit and scope of the invention.

What is claimed is:

1. A polymer composition comprising:
   (A) at least one polyester prepared by the reaction of at least one diol with at least one dicarboxylic acid or dialkyl ester thereof in the presence of a metallic catalyst;
   (B) at least one salt prepared by the reaction of one or more acidic phosphorus-containing compounds with one or more basic organic compounds which contain nitrogen; and
   wherein said one or more basic organic compounds are hindered amine light stabilizers (HALS).

2. A polymer composition according to claim 1 wherein the acidic phosphorus-containing compounds are selected from the group consisting of the compounds having the formulas:

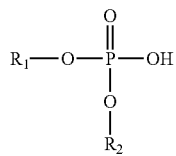
(1)

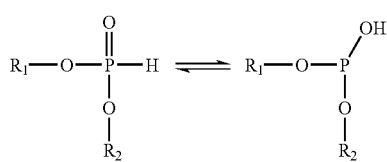
(2)

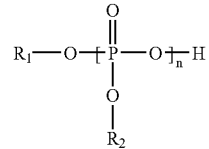
(3)

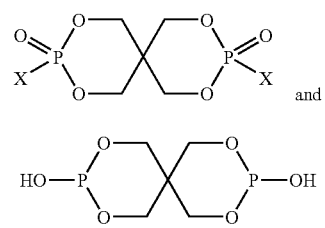
(4)

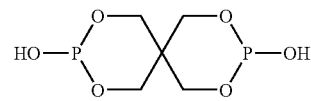
(5)

wherein $R_1$ and $R_2$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

n is 2 to 500; and

X is selected from the group consisting of hydrogen and hydroxy; and wherein the basic organic compounds are selected from the group consisting of compounds having the formulas:

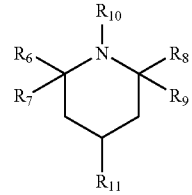
(2)

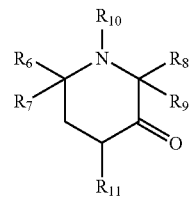
(3)

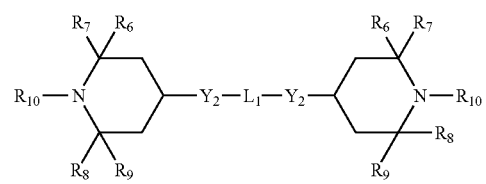
(7)

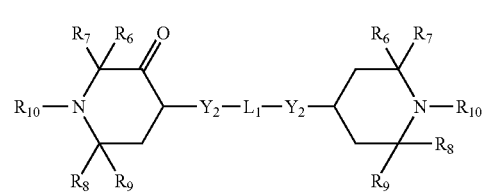
(8)

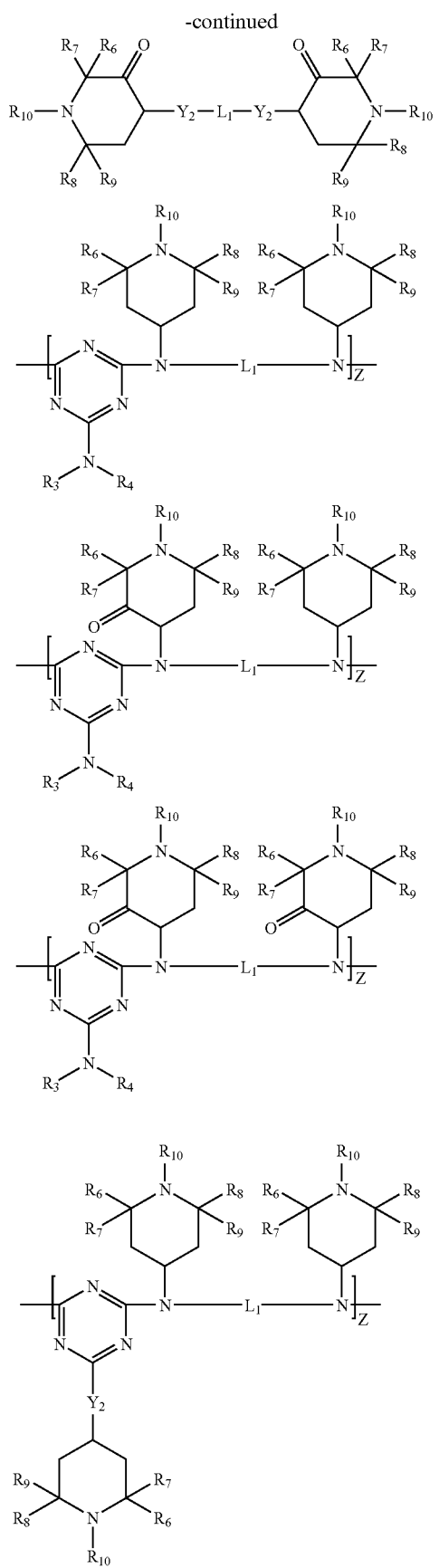

wherein
- R$_1$ and R$_2$ are independently selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;
- R$_3$ and R$_4$, are independently selected from the group consisting of hydrogen, C$_1$-C$_{22}$-alkyl, substituted C$_1$-C$_{22}$-alkyl, C$_3$-C$_8$-cycloalkyl, and substituted C$_3$-C$_8$-cycloalkyl wherein at least one of R$_3$ or R$_4$, is a substituent other than hydrogen; R$_3$ and R$_4$ may collectively may represent a divalent group forming a ring with the nitrogen atom to which they are attached;
- R$_6$, R$_7$, R$_8$, and R$_9$ are independently selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, and aryl;
- R$_{10}$ is selected from the group consisting of hydrogen, —OR$_6$, C$_1$-C$_{22}$-alkyl, substituted C$_1$-C$_{22}$-alkyl, C$_3$-C$_8$-cycloalkyl, and substituted C$_3$-C$_8$-cycloalkyl;
- R$_{11}$ is selected from the group consisting of hydrogen, C$_1$-C$_{22}$-alkyl, substituted C$_1$-C$_{22}$-alkyl, C$_3$-C$_8$-cycloalkyl, substituted C$_3$-C$_8$-cycloalkyl, heteroaryl, aryl, —Y$_1$—R$_3$ and a succinimido group having the formula

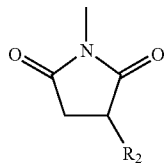

- L$_1$ is a divalent linking group selected from the group consisting of C$_2$-C$_{22}$-alkylene, —(CH$_2$CH$_2$—Y$_1$)$_{1-3}$—CH$_2$CH$_2$—, C$_3$-C$_8$-cycloalkylene, arylene, and —CO-L$_2$-OC—;
- L$_2$ is selected from the group consisting of C$_1$-C$_{22}$-alkylene, arylene, —(CH$_2$CH$_2$—Y$_1$)$_{1-3}$—CH$_2$CH$_2$— and C$_3$-C$_8$-cycloalkylene;
- Y$_1$ is selected from the group consisting of —OC(O)—, —NHC(O)—, —O—, —S—, and —N(R$_1$)—;
- Y$_2$ is —O— or —N(R$_1$)—;
- Z is a positive integer of up to about 20;
- m1 is an integer from 0 to about 10;
- n1 is a positive integer from 2 to about 12;

and wherein the ratio of the number of phosphorus atoms in the acidic phosphorus-containing compound to the number of basic nitrogen atoms in the basic organic compound is about 0.05 to about 2.

3. A polymer composition according to claim 2 wherein the polyester of component (A) comprises:
(1) diacid residues comprising at least 50 mole percent terephthalic acid residues, 1,4-cyclohexanedicarboxylic acid residues or a mixture thereof; and
(2) diol residues comprising at least 50 mole percent of ethylene glycol residues, cyclohexanedimethanol residues, or a mixture thereof;
wherein the total of the diacid residues is equal to 100 mole percent and the total of the diol residues also is equal to 100 mole percent.

4. A polymer composition according to claim 2 wherein the polyester of component (A) comprises:
(1) diacid residues comprising at least 50 mole percent terephthalic acid residues, 1,4-cyclohexanedicarboxylic acid residues or a mixture thereof; and
(2) diol residues comprising at least 50 mole percent of ethylene glycol residues, cyclohexanedimethanol residues, or a mixture thereof;

and contains up to about 200 ppmw of at least one of Ti, Co or Mn residues, wherein the total of the diacid residues is equal to 100 mole percent and the total of the diol residues also is equal to 100 mole percent.

5. A polymer composition comprising:
(A) at least one polyester comprising:
(1) diacid residues comprising at least 50 mole percent terephthalic acid residues; and
(2) diol residues comprising at least 50 mole percent of ethylene glycol residues, cyclohexanedimethanol residues, or a mixture thereof;

and contains from about 10 to about 200 ppmw of at least one of Ti, Co or Mn residues, wherein the total of the diacid residues is equal to 100 mole percent and the total of the diol residues also is equal to 100 mole percent; and (B) about 0.01 to about 0.25 weight percent based on the total weight of the composition of at least one salt prepared by the reaction of one or more phosphorus-containing compounds selected from the group consisting of phosphorus acid, phosphoric acid and polyphosphoric acid with one or more basic organic compounds which contain nitrogen,
wherein said one or more basic organic compounds are hindered amine light stabilizers (HALS) having one of the following formulas:

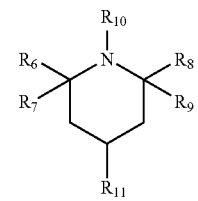

(2)

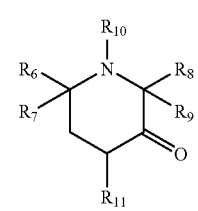

(3)

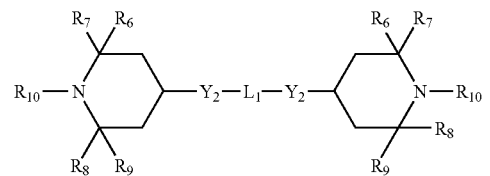

(7)

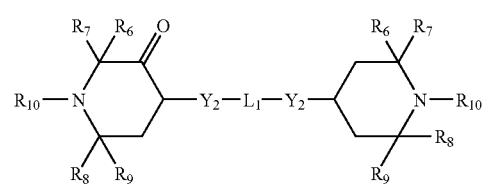

(8)

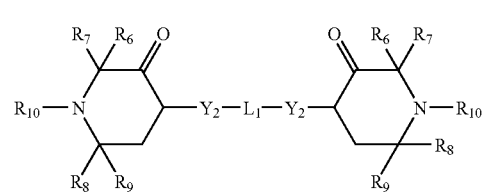

(9)

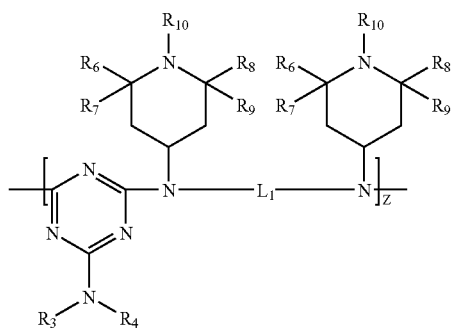
(12)
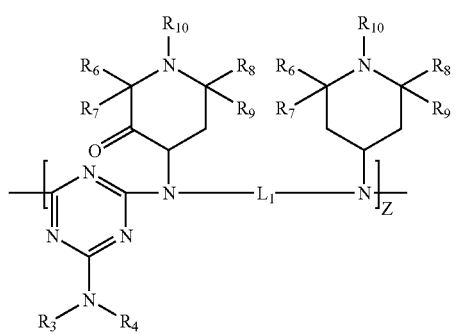
(13)
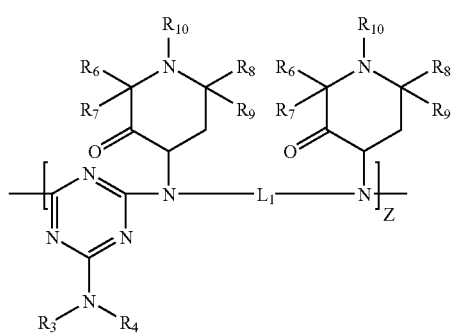
(14)
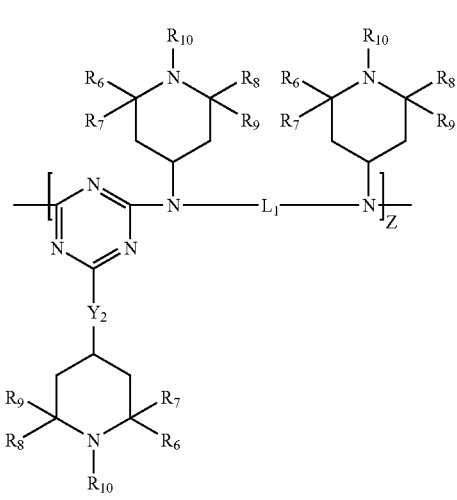
(16)
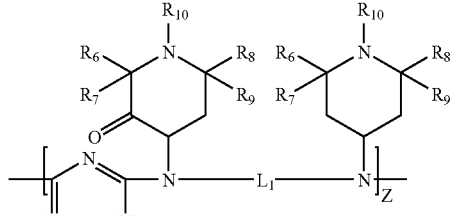
(17)
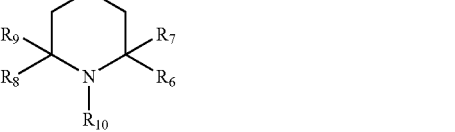
(18)
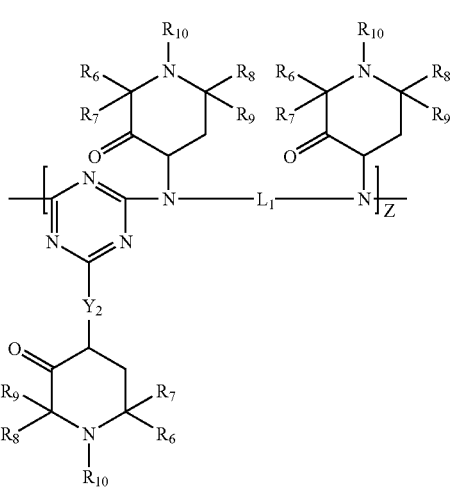
(19)
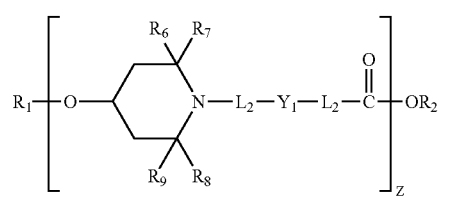
(20)

wherein
R₁ and R₂ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

R₃ and R₄ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of R₃ and R₄ is a substituent other than hydrogen; R₃ and R₄ collectively represent a divalent group forming a ring with the nitrogen atom to which they are attached;

R₆, R₇, R₈, and R₉ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

R₁₀ is selected from the group consisting of hydrogen, —OR₆, $C_1$-$C_{22}$-alkyl, substituted $C_1$-$C_{22}$-alkyl, $C_3$-$C_8$-cycloalkyl, and substituted $C_3$-$C_8$-cycloalkyl;

R₁₁ is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —Y₁—R₃ and a succinimido group having the formula

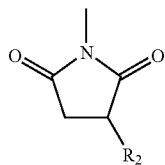

L₁ is a divalent linking group selected from the group consisting of $C_2$-$C_{22}$-alkylene, —(CH₂CH₂—Y₁)₁₋₃—CH₂CH₂—, $C_3$-$C_8$-cycloalkylene, arylene, and —CO-L₂-OC—;

L₂ is selected from the group consisting of $C_1$-$C_{22}$-alkylene, arylene, —(CH₂CH₂—ₙ)₁₋₃—CH₂CH₂— and $C_3$-$C_8$-cycloalkylene;

Y₁ is selected from the group consisting of —OC(O)—, —NHC(O)—, —O—, —S—, and —N(R₁)—;

Y₂ is —O— or —N(R₁)—;

Z is a positive integer of up to about 20;

m1 is an integer from 0 to about 10;

n1 is a positive integer selected from 2 to about 12; and the ratio of the number of phosphorus atoms in the acidic phosphorus-containing compound to the number of basic nitrogen atoms in the basic organic compound is about 0.05 to about 2.

6. A composition according to claim 5 wherein the polyester of component (A) has an inherent viscosity of about 0.4 to 1.2 dL/g measured at 25° C. in a 60/40 ratio by weight of phenol/tetrachloroethane and comprises:

(1) diacid residues comprising about 80 to 100 mole percent terephthalic acid residues and about 0 to 20 mole percent isophthalic acid residues; and (2) diol residues comprising about 40 to 100 mole percent 1,4-cyclothexanedimethanol residues and about 0 to 60 mole percent ethylene glycol residues; and wherein the total of the diacid residues is equal to 100 mole percent and the total of the diol residues also is equal to 100 mole percent; and wherein the composition comprises about 0.05 to about 0.15 weight percent based on the total weight of the composition of the at least one salt wherein R₁₀ is hydrogen or alkyl and the ratio of the number of phosphorus atoms in the acidic phosphorus-containing compound to the number of basic nitrogen atoms in the basic organic compound is about 0.25 to about 1.1.

7. The composition of claim 6 wherein the polyester of component (A) is has an inherent viscosity of about 0.4 to 0.8 dL/g measured at 25° C. in a 60/40 ratio by weight of phenol/tetrachloroethane and comprises:

(1) diacid residues comprising about 80 to 100 mole percent terephthalic acid residues and about 0 to 20 mole percent isophthalic acid residues; and (2) diol residues comprising about 55 to 80 mole percent 1,4-cyclohexanedimethanol residues and 20 to about 45 mole percent ethylene glycol residues, wherein the total of the diacid residues is equal to 100 mole percent and the total of the diol residues also is equal to 100 mole percent.

8. A composition according to claim 5 wherein the polyester of component (A) has an inherent viscosity of about 0.4 to 1.2 dL/g measured at 25° C. in a 60/40 ratio by weight of phenol/tetrachloroethane and comprises:

(1) diacid residues comprising about 65 to 83 mole percent terephthalic acid residues and about 35 to 17 mole percent isophthalic acid residues; and (2) diol residues comprising about 80 to 100 mole percent 1,4-cyclohexanedimethanol residues and about 0 to about 20 mole percent ethylene glycol residues, wherein the total of the diacid residues is equal to 100 mole percent and the total of the diol residues also is equal to 100 mole percent; and wherein the composition comprises about 0.05 to about 0.15 weight percent based on the total weight of the composition of the at least one salt wherein R₁₀ is hydrogen or alkyl and the ratio of the number of phosphorus atoms in the acidic phosphorus-containing compound to the number of basic nitrogen atoms in the basic organic compound is about 0.25 to about 1.1.

9. The composition of claim 8 wherein the polyester of component (A) has an inherent viscosity of about 0.4 to 0.8 dL/g measured at 25° C. in a 60/40 ratio by weight of phenol/tetrachloroethane and comprises:

(1) diacid residues comprising about 70 to 80 mole percent terephthalic acid residues and about 30 to 20 mole percent isophthalic acid residues; and (2) diol residues comprising about 90 to 100 mole percent 1,4-cyclohexandedimthanol residues and 0 to about 10 mole percent ethylene glycol residues, wherein the total of the diacid residues is equal to 100 mole percent and the total of the diol residues also is equal to 100 mole percent.

10. A composition according to claim 5 wherein the polyester of component (A) has an inherent viscosity of about 0.4 to 1.2 dL/g measured at 25° C. in a 60/40 ratio by weight of phenol/tetrachloroethane and comprises:

(1) diacid residues comprising at least about 80 mole percent 1,4-cyclohexanedicarboxylic acid residues; and (2) diol residues comprising at least about 80 mole percent 1,4-cyclohexanedimethanol residues; and wherein the composition comprises about 0.05 to about 0.15 weight percent based on the total weight of the composition of the at least one salt wherein R₁₀ is hydrogen or alkyl and the ratio of the number of phosphorus atoms in the acidic phosphorus-containing compound to the number of basic nitrogen atoms in the basic organic compound is about 0.25 to about 1.1.

11. A composition according to claim 10 wherein the polyester of component (A) has an inherent viscosity of about 0.4 to 0.8 dL/g measured at 25° C. in a 60/40 ratio by weight of phenol/tetrachloroethane and comprises:
  (1) diacid residues comprising about 100 mole percent 1,4-cyclohexanedicarboxylic acid residues;
  (2) diol residues comprising about 100 mole percent 1,4-cyclohexanedimethanol residues.
12. A polymer composition comprising:
  (A) at least one polyester having an inherent viscosity of about 0.4 to 1.2 dL/g measured at 25° C. in a 60/40 ratio by weight of phenol/tetrachloroethane and comprises
    (1) diacid residues comprising at least 50 mole percent terephthalic acid residues; and
    (2) diol residues comprising at least 50 mole percent of ethylene glycol residues, cyclohexanedimethanol residues, or a mixture thereof;
and contains from about 10 to about 200 ppmw of at least one of Ti, Co or Mn residues, wherein the total of the diacid residues is equal to 100 mole percent and the total of the diol residues also is equal to 100 mole percent; and
  (B) about 0.01 to about 0.25 weight percent based on the total weight of the composition of at least one salt prepared by the reaction of phosphorous acid with one or more basic organic compounds which contain nitrogen, wherein said one or more basic organic compounds are hindered amine light stabilizers (HALS) having one of the following the formulas:

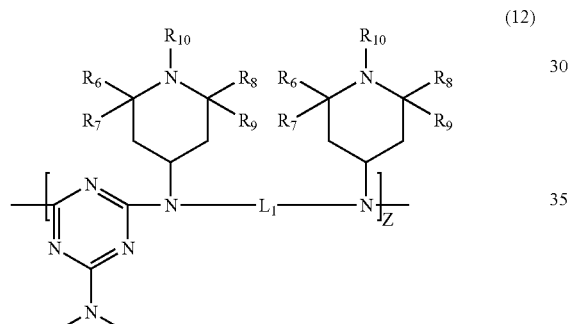
(12)

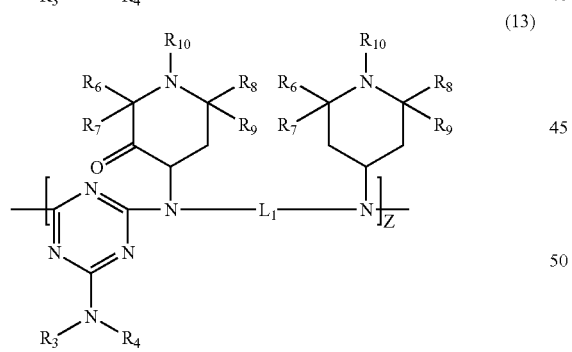
(13)

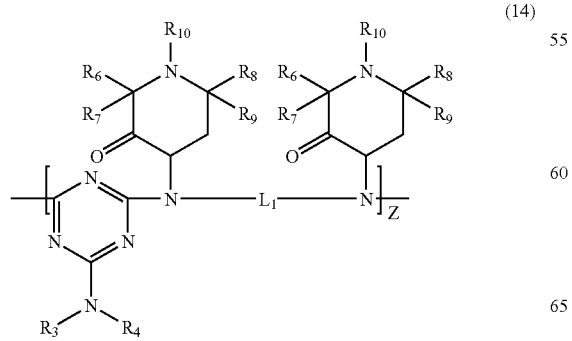
(14)

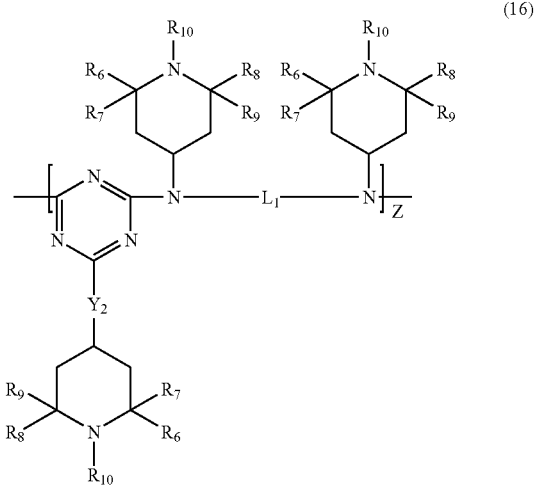
(16)

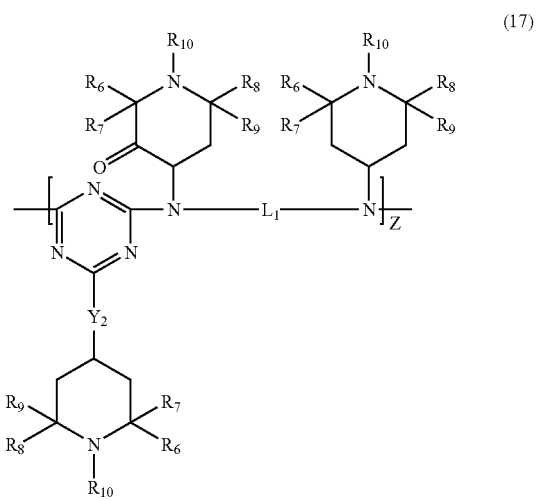
(17)

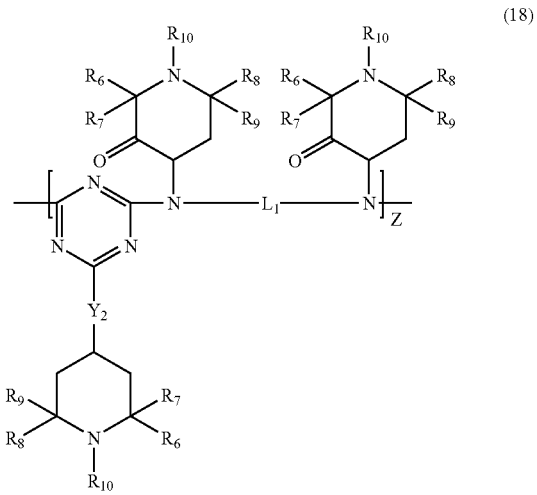
(18)

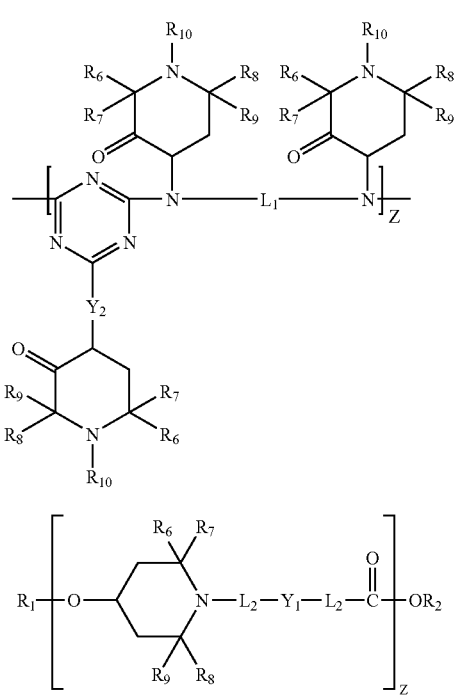

wherein
- $R_1$ and $R_2$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_3$ and $R_4$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$ and $R_4$ is a substituent other than hydrogen; $R_3$ and $R_4$ collectively represent a divalent group forming a ring with the nitrogen atom to which they are attached;
- $R_6$, $R_7$, $R_8$, and $R_9$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_{10}$ is selected from the group consisting of hydrogen and $C_1$-$C_{22}$-alkyl;
- $L_1$ is a divalent linking group selected from the group consisting of $C_2$-$C_{22}$-alkylene, —(CH$_2$CH$_2$—$_{Y1}$)$_{1-3}$—CH$_2$CH$_2$—, $_{C3}$-$C_8$-cycloalkylene, arylene, and —CO-$L_2$-OC—;
- $L_2$ is selected from the group consisting of $C_1$-$C_{22}$-alkylene, arylene, —(-CH$_2$CH$_2$—Y)$_{1-3}$—CH$_2$CH$_2$— and $C_3$-$C_8$-cycloalkylene;
- $Y_1$ is selected from the group consisting of —OC(O)—, —NHC(O)—, —O—, —S—, and —N(R$_1$)—;
- $Y_2$ is —O— or —N(R$_1$)—;
- Z is a positive integer of up to about 6;
- m1 is an integer from 0 to about 10;
- n1 is a positive integer from 2 to about 12;
- and the ratio of the number of phosphorus atoms in the acidic phosphorus-containing compound to the number of basic nitrogen atoms in the basic organic compound is about 0.05 to about 2.

13. A composition of claim 12 wherein the polyester of component (A) has an inherent viscosity of about 0.4 to 0.8 dL/g measured at measured at 25° C. in a 60/40 ratio by weight of phenol/tetrachloroethane and comprises:
(1) diacid residues comprising about 80 to 100 mole percent terephthalic acid residues and about 0 to 20 mole percent isophthalic acid residues; and
(2) diol residues comprising about 55 to 80 mole percent 1,4-cyclohexanedimethanol residues and 20 to about 45 mole percent ethylene glycol residues,
wherein the total of the diacid residues is equal to 100 mole percent and the total of the diol residues also is equal to 100 mole percent; and
wherein the composition comprises about 0.05 to about 0.15 weight percent based on the total weight of the composition of the at least one salt wherein the ratio of the number of phosphorus atoms in the acidic phosphorus-containing compound to the number of basic nitrogen atoms in the basic organic compound is about 0.25 to about 1.1.

14. A composition according to claim 12 wherein the polyester of component (A) has an inherent viscosity of about 0.4 to 0.8 dL/g measured at 25° C. in a 60/40 ratio by weight of phenol/tetrachloroethane and comprises:
(1) diacid residues comprising about 70 to 80 mole percent terephthalic acid residues and about 30 to 20 mole percent isophthalic acid residues; and
(2) diol residues comprising about 90 to 100 mole percent 1,4-cyclohexanedimethanol residues and 0 to about 10 mole percent ethylene glycol residues, wherein the total of the diacid residues is equal to 100 mole percent and the total of the diol residues also is equal to 100 mole percent; and
wherein the composition comprises about 0.05 to about 0.15 weight percent based on the total weight of the composition of the at least one salt wherein the ratio of the number of phosphorus atoms in the acidic phosphorus-containing compound to the number of basic nitrogen atoms in the basic organic compound is about 0.25 to about 1.1.

15. A composition according to claim 12 wherein the polyester of component (A) has an inherent viscosity of about 0.4 to 0.8 dL/g measured at 25° C. in a 60/40 ratio by weight of phenol/tetrachloroethane and comprises:
(1) diacid residues comprising at least about 90 mole percent 1,4-cyclohexanedicarboxylic acid residues; and
(2) diol residues comprising at least about 90 mole percent 1,4-cyclohexanedimethanol dimethanol residues, wherein the total of the diacid residues is equal to 100 mole percent and the total of the diol residues also is equal to 100 mole percent; and
wherein the composition comprises about 0.05 to about 0.15 weight percent based on the total weight of the composition of the at least one salt wherein the ratio of the number of phosphorus atoms in the acidic phosphorus-containing compound to the number of basic nitrogen atoms in the basic organic compound is about 0.25 to about 1.1.

16. A polymer composition comprising:
(A) at least one polyester having an inherent viscosity of about 0.4 to 1.2 dL/g measured at 25° C. in a 60/40 ratio by weight of phenol/tetrachloroethane and comprises:
(1) diacid residues comprising at least 50 mole percent terephthalic acid residues; and
(2) diol residues comprising at least 50 mole percent of ethylene glycol residues, cyclohexanedimethanol residues, or a mixture thereof;
and contains about 10 to 200 ppmw of at least one of Ti, Co or Mn residues, wherein the total of the diacid residues is equal to 100 mole percent and the total of the diol residues also is equal to 100 mole percent; and (B) about 0.01 to about 0.25 weight percent based on the total weight of the composition of at least one salt prepared by the reaction of phosphorous acid with a basic organic compound, wherein said basic organic compound is a hindered amine light stabilizer (HALS) having the formula:

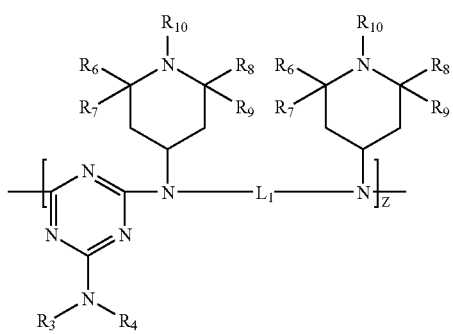

(12)

wherein $R_3$ and $R_4$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$ and $R_4$ is a substituent other than hydrogen; $R_3$ and $R_4$ collectively represent a divalent group forming a ring with the nitrogen atom to which they are attached;

$R_6$, $R_7$, $R_8$, and $R_9$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_{10}$ is selected from the group consisting of hydrogen and $C_1$-$C_{22}$-alkyl;

$L_1$ is a divalent linking group selected from the group consisting of $C_2$-$C_{22}$-alkylene, —(CH$_2$CH$_2$—Y$_1$)$_{1-3}$—CH$_2$CH$_2$—, $C_3$-$C_8$-cycloalkylene, arylene, and —CO-L$_2$-OC—;

$L_2$ is selected from the group consisting of $C_1$-$C_{22}$-alkylene, arylene, —(CH$_2$CH$_2$—Y$_1$)$_{1-3}$—CH$_2$CH$_2$— and $C_3$-$C_8$-cycloalkylene;

$Y_1$ is selected from the group consisting of —OC(O)—, —NHC(O)—, —O—, —S—, and —N(R$_1$)—; and Z is a positive integer of up to about 6.

17. A composition according to claim 16 wherein the polyester of component (A) has an inherent viscosity of about 0.4 to 0.8 dL/g measured at 25° C. in a 60/40 ratio by weight of phenol/tetrachloroethane and comprises:

(1) diacid residues comprising about 80 to 100 mole percent terephthalic acid residues and about 0 to 20 mole percent isophthalic acid residues; and (2) diol residues comprising about 55 to 80 mole percent 1,4-cyclohexanedimethanol residues and 20 to about 45 mole percent ethylene glycol residues, and wherein the composition comprises about 0.05 to about 0.15 weight percent based on the total weight of the composition of the salt wherein $R_6$=$R_7$=$R_8$=$R_9$=$R_{10}$=methyl; $L_1$ is hexamethylene; and ($R_3$)($R_4$)N— collectively represents a morpholino group and the ratio of the number of phosphorus atoms in the acidic phosphorus-containing compound to the number of basic nitrogen atoms in the basic organic compound is about 0.25 to about 1.1.

18. A composition according to claim 16 wherein the polyester of component (A) has an inherent viscosity of about 0.4 to 0.8 dL/g measured at 25° C. in a 60/40 ratio by weight of phenol/tetrachloroethane and comprises:

(1) diacid residues comprising about 70 to 80 mole percent terephthalic acid residues and about 30 to 20 mole percent isophthalic acid residues; and (2) diol residues comprising about 90 to 100 mole percent 1,4-cyclohexanedimethanol residues and 0 to about 10 mole percent ethylene glycol residues, and wherein the composition comprises about 0.05 to about 0.15 weight percent based on the total weight of the composition of the salt wherein $R_6$=$R_7$=$R_8$=$R_9$=$R_{10}$=methyl; $L_1$ is hexamethylene; and ($R_3$)($R_4$)N— collectively represents a morpholino group and the ratio of the number of phosphorus atoms in the acidic phosphorus-containing compound to the number of basic nitrogen atoms in the basic organic compound is about 0.25 to about 1.1.

19. A composition according to claim 16 wherein the polyester of component (A) has an inherent viscosity of about 0.4 to 0.8 dL/g measured at 25° C. in a 60/40 ratio by weight of phenol/tetrachloroethane and comprises:

(1) diacid residues comprising at least about 90 mole percent 1,4-cyclohexanedicarboxylic acid residues; and (2) diol residues comprising at least about 90 mole percent 1,4-cyclohexanedimethanol residues; and wherein the composition comprises about 0.05 to about 0.15 weight percent based on the total weight of the composition of the at least one salt wherein the ratio of the number of phosphorus atoms in the acidic phosphorus-containing compound to the number of basic nitrogen atoms in the basic organic compound is about 0.25 to about 1.1.

20. A polymer composition comprising:

(A) at least one polyester prepared by the reaction of at least one diol with at least one dicarboxylic acid or dialkyl ester thereof in the presence of a metallic catalyst;

(B) at least one salt prepared by the reaction of one or more acidic phosphorus-containing compounds with one or more basic organic compounds which contain nitrogen; and (C) a polycarbonate, wherein said one or more basic organic compounds are hindered amine light stabilizers (HALS).

21. A polymer composition according to claim 20 wherein the acidic phosphorus compounds are selected from the group consisting of compounds having the formulas:

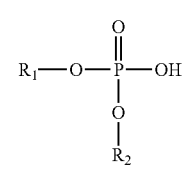

(1)

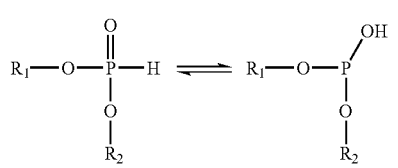

(2)

-continued

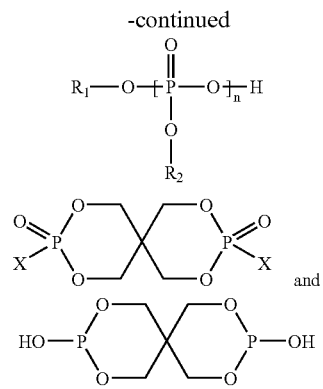

wherein
$R_1$ and $R_2$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

n is 2 to 500; and

X is selected from the group consisting of hydrogen and hydroxy;

and wherein the basic organic compounds are selected from the group consisting of compounds having the formulas:

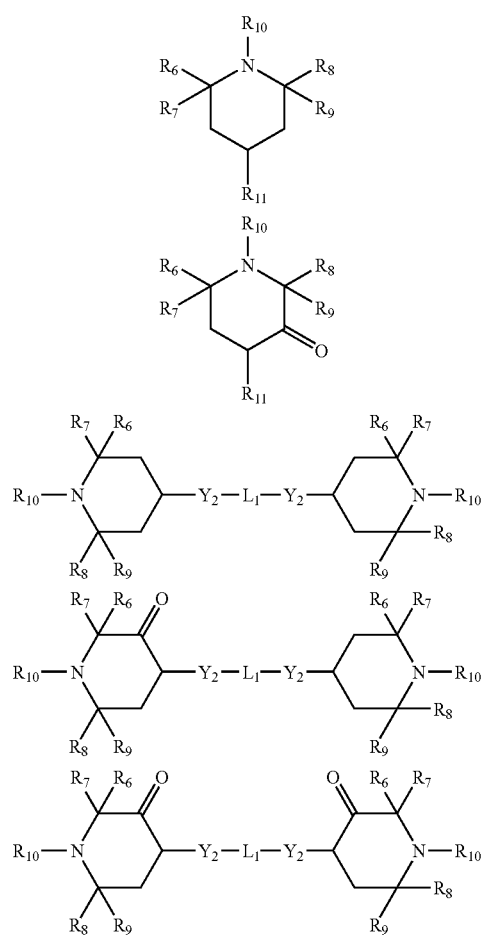

-continued

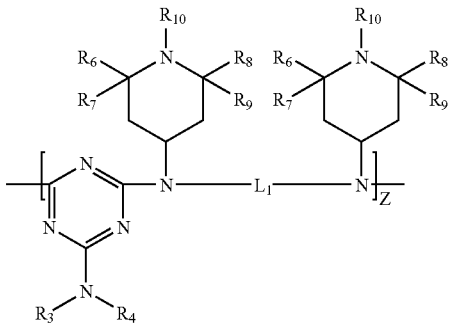

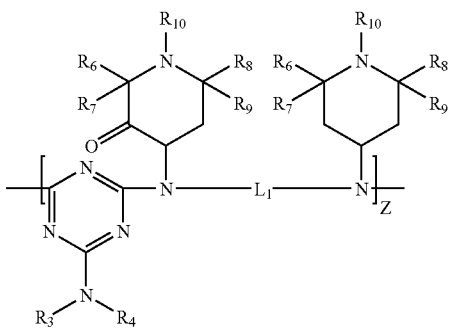

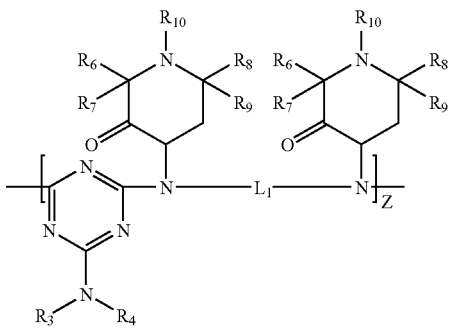

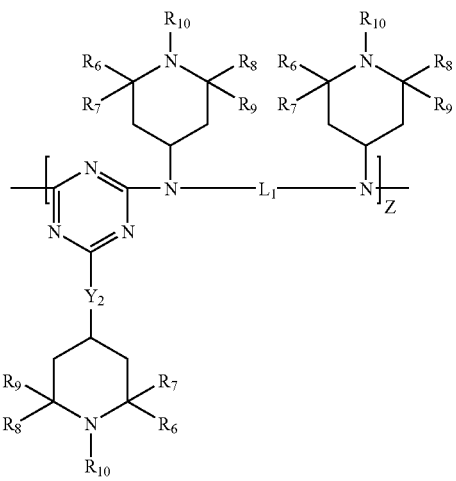

-continued

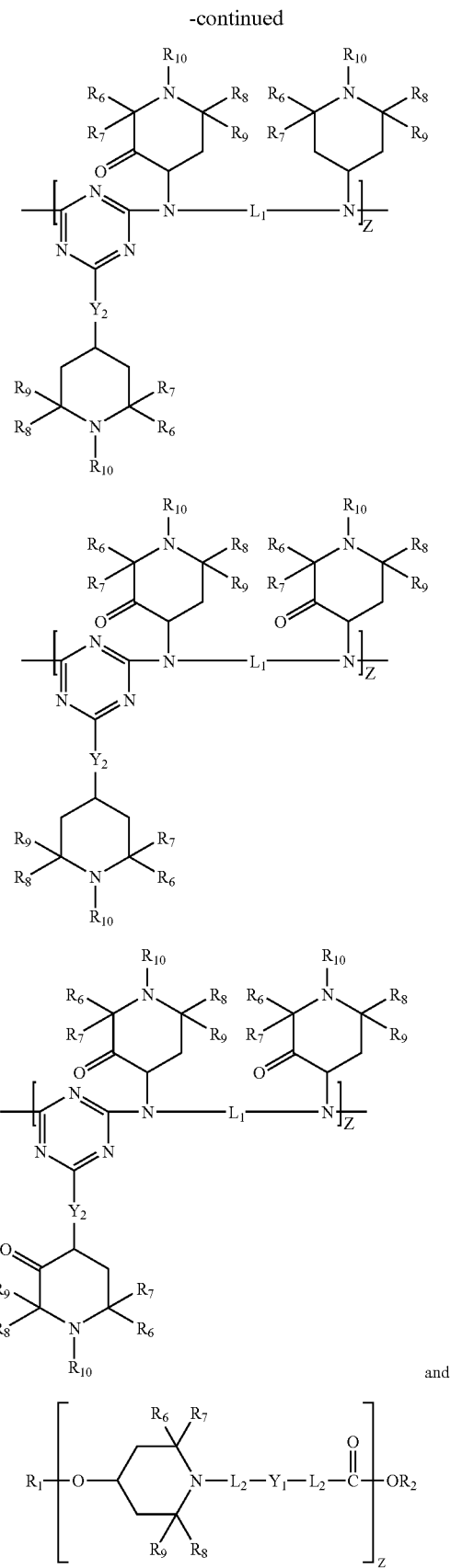

wherein
- $R_1$ and $R_2$ are independently is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_3$ and $R_4$, are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$ or $R_4$, is a substituent other than hydrogen; $R_3$ and $R_4$ collectively may represent a divalent group forming a ring with the nitrogen atom to which they are attached;
- $R_6$, $R_7$, $R_8$, and $R_9$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_{10}$ is selected from the group consisting of hydrogen, —$OR_6$, $C_1$-$C_{22}$-alkyl, substituted $C_1$-$C_{22}$-alkyl, $C_3$-$C_8$-cycloalkyl, and substituted $C_3$-$C_8$-cycloalkyl;
- $R_{11}$ is hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_3$ or a succinimido group having the formula

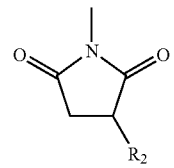

- $L_1$ is a divalent linking group selected from the group consisting of $C_2C_{22}$-alkylene, —$(CH_2CH_2$—$n)_{1-3}$—$CH_2CH_2$—, $C_3$-$C_8$-cycloalkylene, arylene, and —CO-$L_2$-OC—;
- $L_2$ is selected from the group consisting of $C_1$-$C_{22}$-alkylene, arylene, —$(CH_2CH_2$—$Y_1)_{1-3}$—$CH_2CH_2$— and $C_3$-$C_8$-cycloalkylene;
- $Y_1$ is selected from the group consisting of —OC(O)—, —NHC(O)—, —O—, —S—, and —N($R_1$)—;
- $Y_2$ is —O— or —N($R_1$)—;
- Z is a positive integer of up to about 20;
- m1 is an integer from 0 to about 10;
- n1 is a positive integer from 2 to about 12;

and wherein the ratio of the number of phosphorus atoms in the acidic phosphorus-containing compound to the number of basic nitrogen atoms in the basic organic compound is about 0.05 to about 2.

22. A polymer composition according to claim 21 wherein the polyester of component (A) comprises:
(1) diacid residues comprising at least 50 mole percent terephthalic acid residues; and
(2) diol residues comprising at least 50 mole percent of ethylene glycol residues, cyclohexanedimethanol residues, or a mixture thereof;
wherein the total of the diacid residues is equal to 100 mole percent and the total of the diol residues also is equal to 100 mole percent.

23. A polymer composition according to claim 21 wherein the polyester of component (A) comprises:
(1) diacid residues comprising at least 50 mole percent terephthalic acid residues; and
(2) diol residues comprising at least 50 mole percent of ethylene glycol residues, cyclohexanedimethanol residues, or a mixture thereof;
and contains up to about 200 ppmw of at least one of Ti, Co or Mn residues,
wherein the total of the diacid residues is equal to 100 mole percent and the total of the diol residues also is equal to 100 mole percent; and component (C) comprises a bisphenol A polycarbonate, wherein the weight ratio of polyester component (A) to polycarbonate component (C) is about 75:25 to about 25:75.

24. A polymer composition comprising:

(A) at least one polyester comprising:
  (1) diacid residues comprising at least 50 mole percent terephthalic acid residues; and
  (2) diol residues comprising at least 50 mole percent of ethylene glycol residues, cyclohexanedimethanol residues, or a mixture thereof;
  and contains about 10 to 200 ppmw of at least one of Ti, Co and Mn residues,
  wherein the total of the diacid residues is equal to 100 mole percent and the total of the diol residues also is equal to 100 mole percent; and (B) about 0.01 to about 0.25 weight percent based on the total weight of the composition of at least one salt prepared by the reaction of one or more acidic phosphorus-containing compounds selected from the group consisting of phosphorous acid, phosphoric acid and polyphosphoric acid with one or more basic organic compounds which contain nitrogen, wherein said one or more basic organic compounds are hindered amine light stabilizers (HALS) having one of the following formulas:

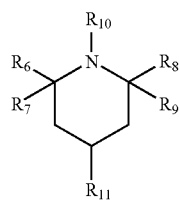
(2)

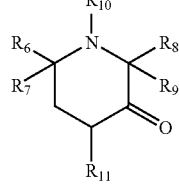
(3)

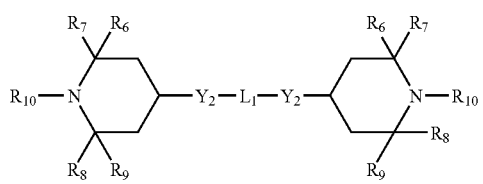
(7)

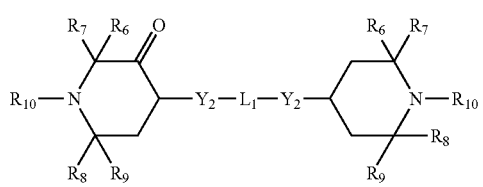
(8)

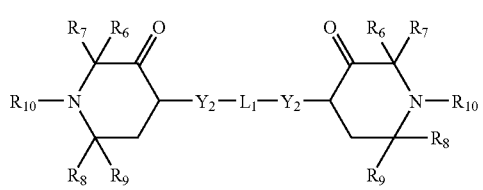
(9)

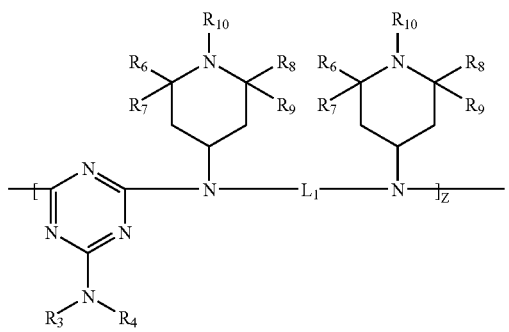
(12)

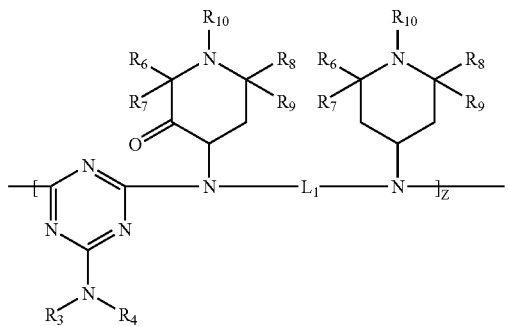
(13)

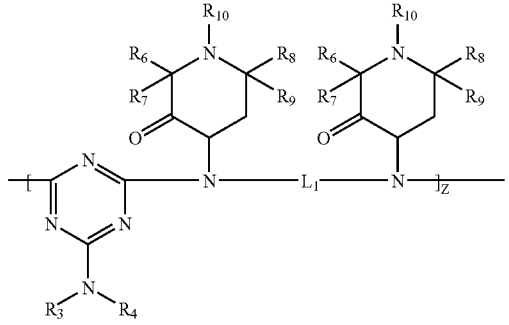
(14)

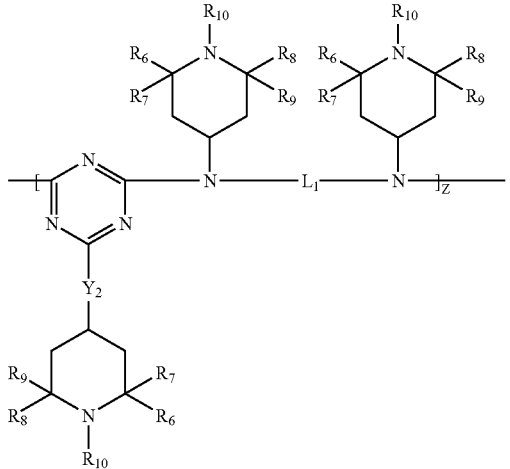
(16)

-continued (17)

(18)

(19)

(20)

wherein
R₁ and R₂ are independently is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

R₃ and R₄ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of R₃ and R₄ is a substituent other than hydrogen; R₃ and R₄ collectively represent a divalent group forming a ring with the nitrogen atom to which they are attached;

R₆, R₇, R₈, and R₉ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

R₁₀ is selected from the group consisting of hydrogen, —OR₆, $C_1$-$C_{22}$-alkyl, substituted $C_1$-$C_{22}$-alkyl, $C_3$-$C_8$-cycloalkyl, and substituted $C_3$-$C_8$-cycloalkyl;

R₁₁ is hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —Y₁—R₃ or a succinimido group having the formula

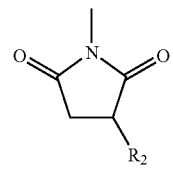

L₁ is a divalent linking group selected from the group consisting of $C_2$-$C_{22}$-alkylene, —(CH₂CH₂—Y₁)₁₋₃—CH₂CH₂—, $C_3$-$C_8$-cycloalkylene, arylene, and —CO-L₂-OC—;

L₂ is selected from the group consisting of $C_1$-$C_{22}$-alkylene, arylene, —(CH₂CH₂—Y₁)₁₋₃—CH₂CH₂— and $C_3$-$C_8$-cycloalkylene;

Y₁ is selected from the group consisting of —OC(O)—, —NHC(O)—, —O—, —S—, and —N(R₁)—;

Y₂ is —O— or —N(R₁)—;

Z is a positive integer of up to about 20;

m1 is an integer from 0 to about 10;

n1 is a positive integer from 2 to about 12;

and the ratio of the number of phosphorus atoms in the acidic phosphorus-containing compound to the number of basic nitrogen atoms in the basic organic compound is about 0.05 to about 2; and (C) a polycarbonate, wherein the weight ratio of polyester component (A) to polycarbonate component (C) is about 75:25 to about 25:75.

25. A composition according to claim 24 wherein the polyester of component (A) has an inherent viscosity of about 0.4 to 1.2 dL/g measured at 25° C. in a 60/40 ratio by weight of phenol/tetrachloroethane and comprises:

(1) diacid residues comprising about 80 to 100 mole percent terephthalic acid residues and about 0 to 20 mole percent isophthalic acid residues; and (2) diol residues comprising about 40 to 100 mole percent 1,4-cyclohexanedimethanol residues and 0 to about 60 mole percent ethylene glycol residues;

the composition comprises about 0.05 to about 0.15 weight percent based on the total weight of the composition of the at least one salt wherein R₁₀ is hydrogen or alkyl and the ratio of the number of phosphorus atoms in the acidic phosphorus-containing compound to the number of basic nitrogen atoms in the basic organic compound is about 0.25 to about 1.1; and component (C) comprises a bisphenol A polycarbonate.

26. The composition of claim 25 wherein the polyester of component (A) is has an inherent viscosity of about 0.4 to 0.8 dL/g measured at 25° C. in a 60/40 ratio by weight of phenol/tetrachloroethane and comprises:

(1) diacid residues comprising about 80 to 100 mole percent terephthalic acid residues and about 0 to 20 mole percent isophthalic acid residues; and (2) diol residues comprising about 55 to 80 mole percent 1,4-cyclohexanedimethanol residues and 20 to about 45 mole percent ethylene glycol residues.

27. A composition according to claim 24 wherein the polyester of component (A) has an inherent viscosity of about 0.4 to 1.2 dL/g measured at 25° C. in a 60/40 ratio by weight of phenol/tetrachloroethane and comprises:

(1) diacid residues comprising about 65 to 83 mole percent terephthalic acid residues and about 35 to 17 mole percent isophthalic acid residues; and (2) diol residues comprising about 80 to 100 mole percent 1,4-cyclohexanedimethanol residues and about 0 to about 20 mole percent ethylene glycol residues;

the composition comprises about 0.05 to about 0.15 weight percent based on the total weight of the composition of the at least one salt wherein $R_{10}$ is hydrogen or alkyl and the ratio of the number of phosphorus atoms in the acidic phosphorus-containing compound to the number of basic nitrogen atoms in the basic organic compound is about 0.25 to about 1.1; and component (C) comprises a bisphenol A polycarbonate.

28. The composition of claim 27 wherein the polyester of component (A) has an inherent viscosity of about 0.4 to 0.8 dL/g measured at 25° C. in a 60/40 ratio by weight of phenol/tetrachloroethane and comprises:

(1) diacid residues comprising about 70 to 80 mole percent terephthalic acid residues and about 30 to 20 mole percent isophthalic acid residues; and (2) diol residues comprising about 90 to 100 mole percent 1,4-cyclohexanedimethanol residues and 0 to about 10 mole percent ethylene glycol residues.

29. A composition according to claim 24 wherein the polyester of component (A) has an inherent viscosity of about 0.4 to 1.2 dL/g measured at 25° C. in a 60/40 ratio by weight of phenol/tetrachloroethane and comprises:

(1) diacid residues comprising at least about 80 mole percent 1,4- Cyclohexanedicarboxylic acid residues; and (2) diol residues comprising at least about 80 mole percent 1,4-cyclohexanedimethanol residues;

the composition comprises about 0.05 to about 0.15 weight percent based on the total weight of the composition of the at least one salt wherein $R_{10}$ is hydrogen or alkyl and the ratio of the number of phosphorus atoms in the acidic phosphorus-containing compound to the number of basic nitrogen atoms in the basic organic compound is about 0.25 to about 1.1; and component (C) comprises a bisphenol A polycarbonate.

30. A composition according to claim 29 wherein the polyester of component (A) has an inherent viscosity of about 0.4 to 0.8 dL/g measured at 25° C. in a 60/40 ratio by weight of phenol/tetrachloroethane and comprises:

(1) diacid residues comprising 100 mole percent 1,4-cyclohexanedicarboxylic acid residues; and (2) diol residues comprising 100 mole percent 1,4-cyclohexanedimethanol residues.

31. A polymer composition comprising:

(A) at least one polyester having an inherent viscosity of about 0.4 to 1.2 dL/g measured at 25° C. in a 60/40 ratio by weight of phenol/tetrachloroethane and comprises:

(1) diacid residues comprising at least 50 mole percent terephthalic acid residues; and (2) diol residues comprising at least 50 mole percent of ethylene glycol residues, cyclohexanedimethanol residues, or a mixture thereof;

and contains about 10 to 200 ppmw of at least one of Ti, Co or Mn residues, wherein the total of the diacid residues is equal to 100 mole percent and the total of the diol residues also is equal to 100 mole percent; and (B) about 0.01 to about 0.25 weight percent based on the total weight of the corn position of at least one salt prepared by the reaction of phosphorous acid with one or more basic organic compounds which contain nitrogen, wherein said one or more basic organic compounds are hindered amine light stabilizers (HALS) having one of the following formulas:

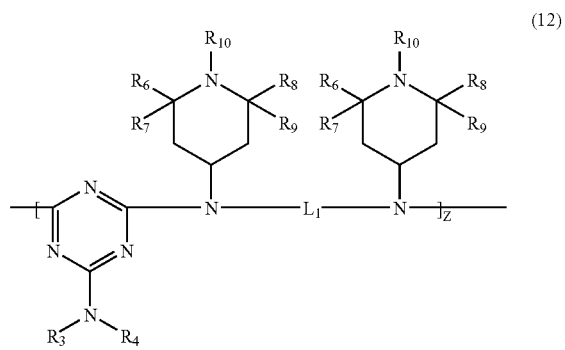

(12)

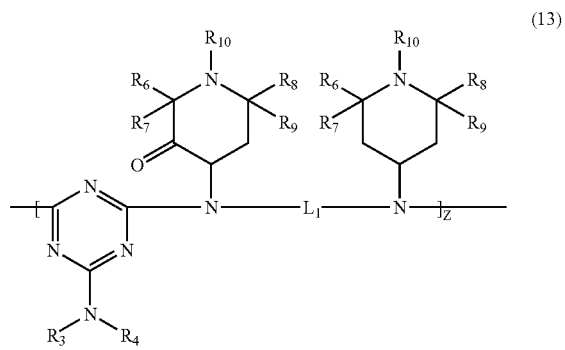

(13)

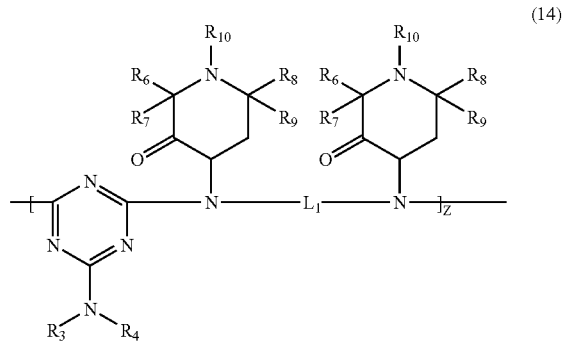

(14)

-continued

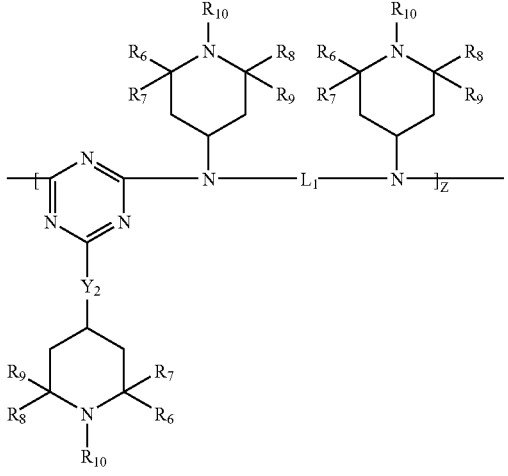
(16)

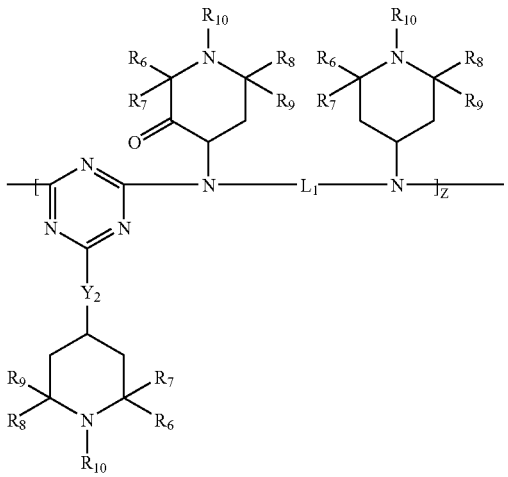
(17)

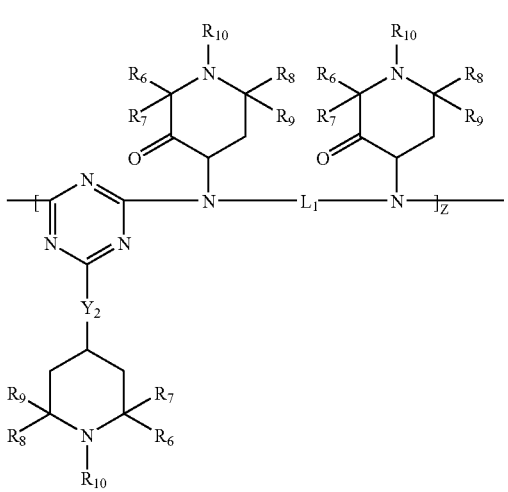
(18)

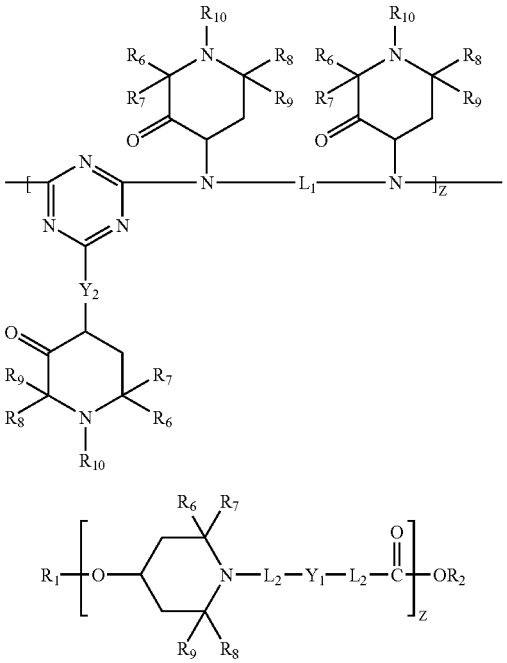
(19)

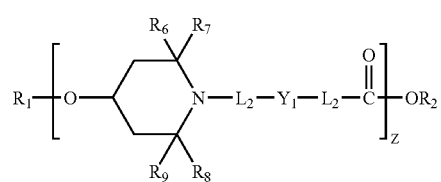
(20)

wherein
$R_1$ and $R_2$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_3$ and $R_4$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$ and $R_4$ is a substituent other than hydrogen; $R_3$ and $R_4$ collectively represent a divalent group forming a ring with the nitrogen atom to which they are attached;

$R_6$, $R_7$, $R_8$, and $R_9$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

$R_{10}$ is selected from the group consisting of hydrogen and $C_1$-$C_{22}$-alkyl;

$L_1$ is a divalent linking group selected from the group consisting of $C_2$-$C_{22}$-alkylene, —(CH$_2$CH$_2$—Y$_1$)$_{1-3}$—CH$_2$CH$_2$—, $C_3$-$C_8$-cycloalkylene, arylene, and —CO-L$_2$-OC—;

$L_2$ is selected from the group consisting of $C_1$-$C_{22}$-alkylene, arylene, —(CH$_2$CH$_2$—Y$_1$)$_{1-2}$—CH$_2$CH$_2$— and $C_3$-$C_8$-cycloalkylene;

$Y_1$ is selected from the group consisting of —OC(O)—, —NHC(O)—, —O—, —S—, and —N(R$_1$)—;

$Y_2$ is —O— or —N(R$_1$)—;

Z is a positive integer of up to about 6;

m1 is an integer from 0 to about 10;

n1 is a positive integer from 2 to about 12;

and the ratio of the number of phosphorus atoms in the acidic phosphorus-containing compound to the number of basic nitrogen atoms in the basic organic compound is about 0.05 to about 2; and (C) a polycarbonate, wherein the weight ratio of polyester component (A) to polycarbonate component (C) is about 75:25 to about 25:75.

32. A composition according to claim 31 wherein the polyester of component (A) has an inherent viscosity of about 0.4 to 0.8 dL/g measured at 25° C. in a 60/40 ratio by weight of phenol/tetrachloroethane and comprises:
(1) diacid residues comprising about 80 to 100 mole percent terephthalic acid residues and about 0 to 20 mole percent isophthalic acid residues; and
(2) diol residues comprising about 55 to 80 mole percent 1,4-cyclohexanedimethanol residues and 20 to about 45 mole percent ethylene glycol residues,
the composition comprises about 0.05 to about 0.15 weight percent based on the total weight of the composition of the at least one salt wherein the ratio of the number of phosphorus atoms in the acidic phosphorus-containing compound to the number of basic nitrogen atoms in the basic organic compound is about 0.25 to about 1.1, and component (C) comprises a bisphenol A polycarbonate.

33. A composition according to claim 31 wherein the polyester of component (A) has an inherent viscosity of about 0.4 to 0.8 dL/g measured at 25° C. in a 60/40 ratio by weight of phenol/tetrachloroethane and comprises:
(1) diacid residues comprising about 70 to 80 mole percent terephthalic acid residues and about 30 to 20 mole percent isophthalic acid residues; and
(2) diol residues comprising about 90 to 100 mole percent 1,4-cyclohexanedimethanol residues and 0 to about 10 mole percent ethylene glycol residues,
the composition comprises about 0.05 to about 0.15 weight percent based on the total weight of the composition of the at least one salt wherein the ratio of the number of phosphorus atoms in the acidic phosphorus-containing compound to the number of basic nitrogen atoms in the basic organic compound is about 0.25 to about 1.1, and component (C) comprises a bisphenol A polycarbonate.

34. A composition according to claim 31 wherein the polyester of component (A) has an inherent viscosity of about 0.4 to 0.8 dL/g measured at 25° C. in a 60/40 ratio by weight of phenol/tetrachloroethane and comprises:
(1) diacid residues comprising at least about 90 mole percent 1,4-cyclohexanedicarboxylic acid residues; and
(2) diol residues comprising at least about 90 mole percent 1,4-cyclohexanedimethanol residues;
the composition comprises about 0.05 to about 0.15 weight percent based on the total weight of the composition of the at least one salt wherein the ratio of the number of phosphorus atoms in the acidic phosphorus-containing compound to the number of basic nitrogen atoms in the basic organic compound is about 0.25 to about 1.1; and component (C) comprises a bisphenol A polycarbonate.

35. A polymer composition comprising:
(A) at least one polyester having an inherent viscosity of about 0.4 to 1.2 dL/g measured at 25° C. in a 60/40 ratio by weight of phenol/tetrachloroethane and comprises:
(1) diacid residues comprising at least 50 mole percent terephthalic acid residues; and
(2) diol residues comprising at least 50 mole percent of ethylene glycol residues, cyclohexanedimethanol residues, or a mixture thereof;
and contains about 10 to 200 ppmw of at least one of Ti, Co or Mn residues, wherein the total of the diacid residues is equal to 100 mole percent and the total of the diol residues also is equal to 100 mole percent; and
(B) about 0.01 to about 0.25 weight percent based on the total weight of the composition of at least one salt prepared by the reaction of phosphorous acid with a basic organic compound, wherein said basic organic compound is a hindered amine light stabilizer (HALS) having the formula:

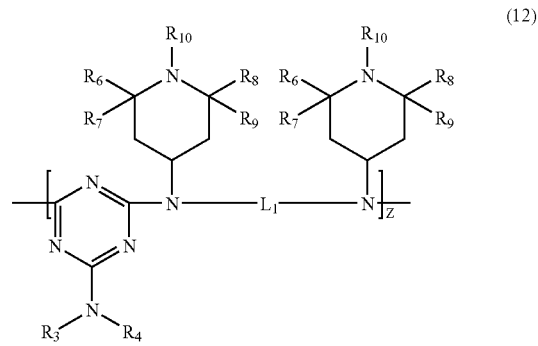

wherein
$R_3$ and $R_4$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$ and $R_4$ is a substituent other than hydrogen; $R_3$ and $R_4$ collectively represent a divalent group forming a ring with the nitrogen atom to which they are attached;
$R_6$, $R_7$, $R_8$, and $R_9$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
$R_{10}$ is selected from the group consisting of hydrogen and alkyl;
$L_1$ is a divalent linking group selected from the group consisting of $C_2$-$C_{22}$-alkylene, —(CH$_2$CH$_2$—Y$_1$)$_{1-3}$—CH$_2$CH$_2$—, $C_3$-$C_8$-cycloalkylene, arylene, and —CO-$L_2$-OC—;
$L_2$ is selected from the group consisting of $C_1$-$C_{22}$-alkylene, arylene, —(CH$_2$CH$_2$—Y$_1$)$_{1-3}$—CH$_2$CH$_2$— and $C_3$-$C_8$-cycloalkylene;
$Y_1$ is selected from the group consisting of —OC(O)—, —NHC(O)—, —O—, —S—, and —N($R_1$)—; and
Z is a positive integer of up to about 6; and
(C) a bisphenol A polycarbonate, wherein the weight ratio of polyester component (A) to polycarbonate component (C) is about 75:25 to about 25:75.

36. A composition according to claim 35 wherein the polyester of component (A) has an inherent viscosity of about 0.4 to 0.8 dL/g measured at 25° C. in a 60/40 ratio by weight of phenol/tetrachloroethane and comprises:
(1) diacid residues comprising about 80 to 100 mole percent terephthalic acid residues and about 0 to 20 mole percent isophthalic acid residues; and
(2) diol residues comprising about 55 to 80 mole percent 1,4-cyclohexanedimethanol residues and 20 to about 45 mole percent ethylene glycol residues, and
wherein the composition comprises about 0.05 to about 0.15 weight percent based on the total weight of the composition of the salt wherein $R_6$=$R_7$=$R_8$=$R_9$=$R_{10}$=methyl; $L_1$ is hexamethylene; and ($R_3$)($R_4$)N— collectively represents a morpholino group and the ratio of the number of phosphorus atoms in the acidic phosphorus-containing compound to the number of basic nitrogen atoms in the basic organic compound is about 0.25 to about 1.1.

37. A composition according to claim 35 wherein the polyester of component (A) has an inherent viscosity of about 0.4 to 0.8 dL/g measured at 25° C. in a 60/40 ratio by weight of phenol/tetrachloroethane and comprises:
- (1) diacid residues comprising about 70 to 80 mole percent terephthalic acid residues and about 30 to 20 mole percent isophthalic acid residues; and
- (2) diol residues comprising about 90 to 100 mole percent 1,4-cyclohexanedimethanol residues and 0 to about 10 mole percent ethylene glycol residues, and wherein the composition comprises about 0.05 to about 0.15 weight percent based on the total weight of the composition of the salt wherein $R_6=R_7=R_8=R_9=R_{10}=$methyl; $L_1$ is hexamethylene; and $(R_3)(R_4)N$— collectively represents a morpholino group and the ratio of the number of phosphorus atoms in the acidic phosphorus-containing compound to the number of basic nitrogen atoms in the basic organic compound is about 0.25 to about 1.1.

38. A composition according to claim 35 wherein the polyester of component (A) has an inherent viscosity of about 0.4 to 0.8 dL/g measured at 25° C. in a 60/40 ratio by weight of phenol/tetrachloroethane and comprises:
- (1) diacid residues comprising at least about 90 mole percent 1,4-cyclohexanedicarboxylic acid residues; and
- (2) diol residues comprising at least about 90 mole percent, 1,4-cyclohexanedimethanol residues; and wherein the composition comprises about 0.05 to about 0.15 weight percent based on the total weight of the composition of the at least one salt wherein the ratio of the number of phosphorus atoms in the acidic phosphorus-containing compound to the number of basic nitrogen atoms in the basic organic compound is about 0.25 to about 1.1.

39. A polymer concentrate comprising:
- (A) at least one polyester prepared by the reaction of at least one diol with at least one dicarboxylic acid or dialkyl ester thereof in the presence of a metallic catalyst; and
- (B) up to about 10 weight percent, based on the total weight of the polyester, of at least one salt prepared by the reaction of one or more acidic phosphorus-containing compounds and one or more basic organic compounds which contain nitrogen, wherein said one or more basic organic compounds are hindered amine light stabilizers (HALS).

40. A polymer concentrate according to claim 39 comprising:
- (A) a polyester comprising:
  - (1) diacid residues comprising at least 50 mole percent terephthalic acid residues, 1,4-cyclohexanedicarboxylic acid residues or a mixture thereof; and
  - (2) diol residues comprising at least 50 mole percent of ethylene glycol residues, cyclohexanedimethanol residues, or a mixture thereof;
  - and up to about 200 ppmw of at least one of Ti, Co or Mn residues;
  - wherein the total of the diacid residues is equal to 100 mole percent and the total of the diol residues also is equal to 100 mole percent; and
- (B) about 5 to about 10 weight percent, based on the total weight of the polyester, of at least one salt prepared by the reaction of one or more acidic phosphorus-containing compounds with one or more basic organic compounds which contain nitrogen;
  wherein the acidic phosphorus compounds are selected from the group consisting of compounds having the formulas:

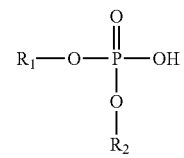
(1)

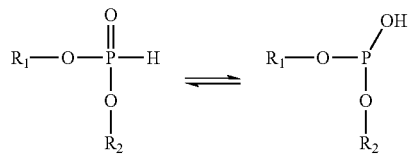
(2)

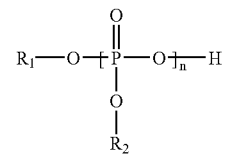
(3)

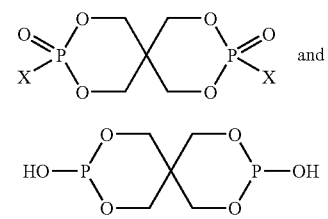
and
(4)

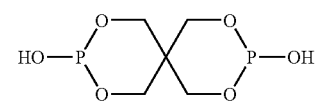
(5)

wherein
$R_1$ and $R_2$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

n is 2 to 500; and

X is selected from the group consisting of hydrogen and hydroxy; and wherein the basic organic compounds are selected from the group consisting of compounds having the formulas:

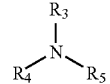
(1)

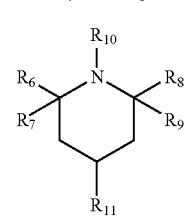
(2)

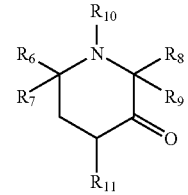
(3)

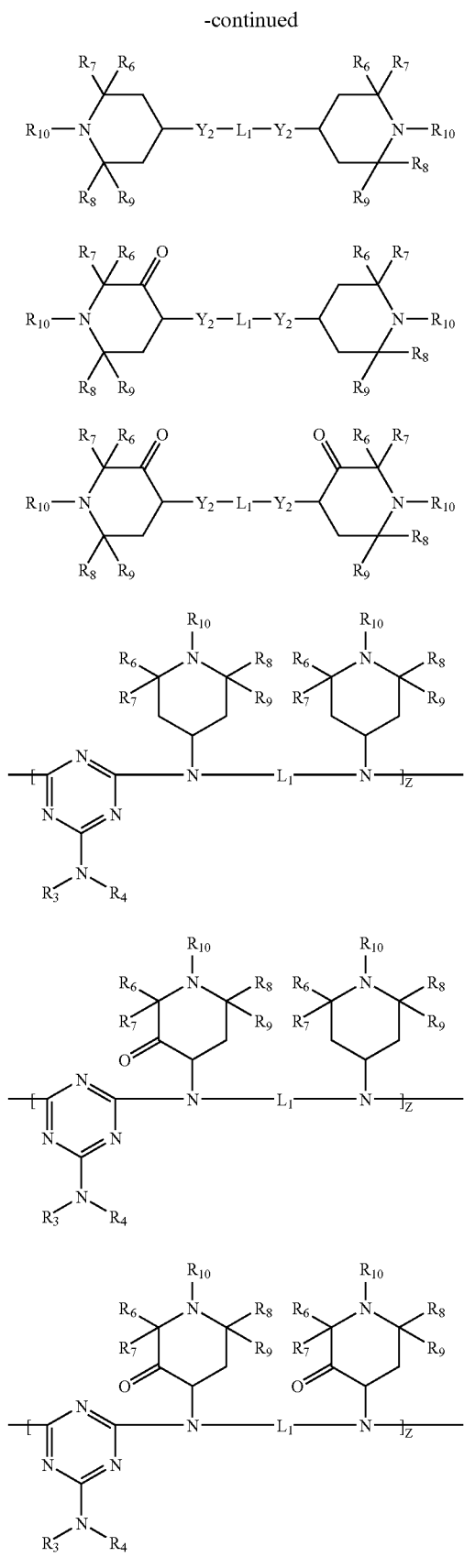
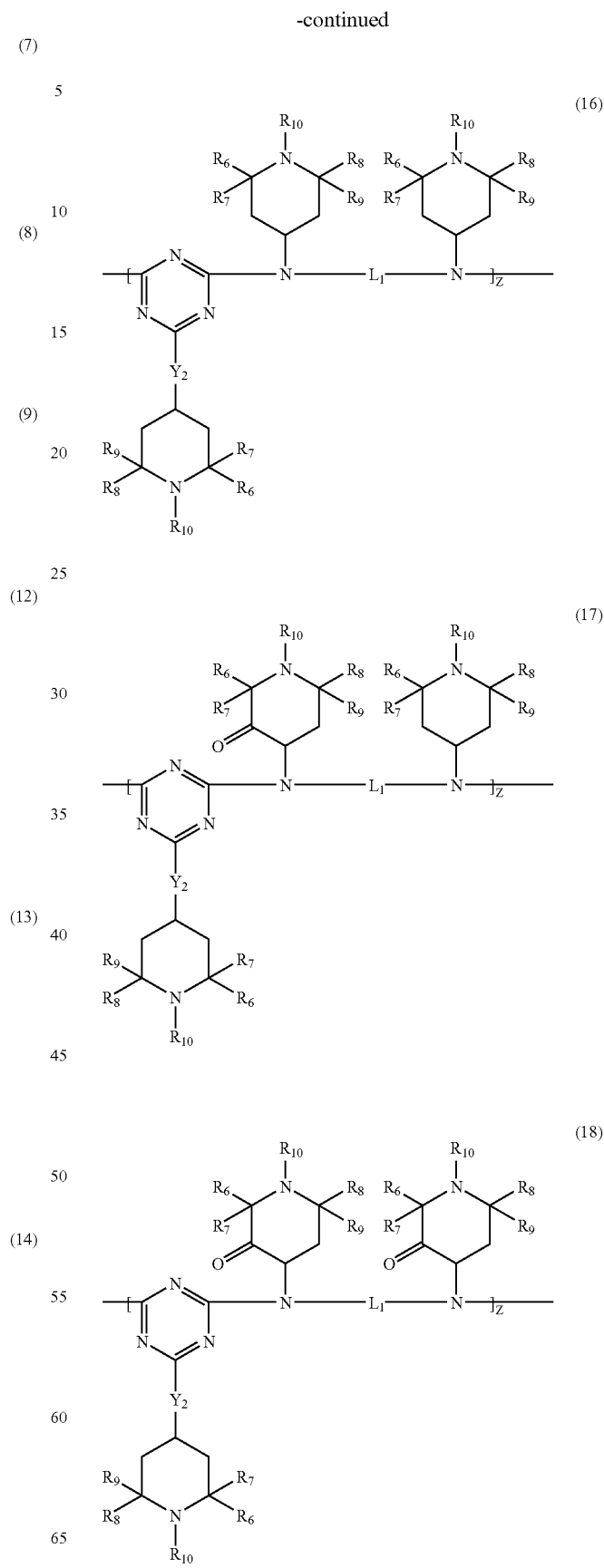

-continued

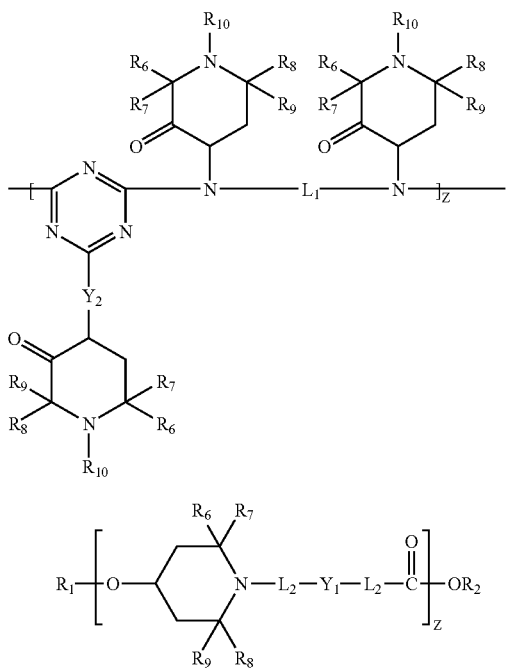

wherein
- $R_1$ and $R_2$ are independently is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_3$ and $R_4$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$ or $R_4$ is a substituent other than hydrogen; $R_3$ and $R_4$ collectively may represent a divalent group forming a ring with the nitrogen atom to which they are attached;
- $R_6$, $R_7$, $R_8$, and $R_9$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_{10}$ is selected from the group consisting of hydrogen, —$OR_6$, $C_1$-$C_{22}$-alkyl, substituted $C_1$-$C_{22}$-alkyl, $C_3$-$C_8$-cycloalkyl, and substituted $C_3$-$C_8$-cycloalkyl;
- $R_{11}$ is hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_3$ or a succinimido group having the formula

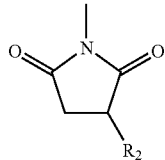

- $L_1$ is a divalent linking group selected from the group consisting of $C_2$-$C_{22}$-alkylene, —(CH$_2$CH$_2$—$Y_1$)$_{1-3}$—CH$_2$CH$_2$—, $C_3$-$C_8$-cycloalkylene, arylene, and —CO-$L_2$-OC—;
- $L_2$ is selected from the group consisting of $C_1$-$C_{22}$-alkylene, arylene, —(CH$_2$CH$_2$—$Y_1$)$_{1-3}$—CH$_2$CH$_2$— and $C_3$-$C_8$-cycloalkylene;

- $Y_1$ is selected from the group consisting of —OC(O)—, —NHC(O)—, —O—, —S—, and —N($R_1$)—;
- $Y_2$ is —O— or —N($R_1$)—;
- Z is a positive integer of up to about 20;
- m1 is an integer from 0 to about 10;
- n1 is a positive integer from 2 to about 12;

and wherein the ratio of the number of phosphorus atoms in the acidic phosphorus-containing compound to number of basic nitrogen atoms in the basic organic compound is about 0.05 to about 2.

41. A polymer concentrate according to claim 39 comprising:
(A) a polyester comprising:
(1) diacid residues comprising at least 50 mole percent terephthalic acid residues, 1,4-cyclohexanedicarboxylic acid residues or a mixture thereof; and
(2) diol residues comprising at least 50 mole percent of ethylene glycol residues, cyclohexanedimethanol residues, or a mixture thereof;
and up to about 200 ppmw of at least one of Ti, Co or Mn residues;
wherein the total of the diacid residues is equal to 100 mole percent and the total of the diol residues also is equal to 100 mole percent; and
(B) about 5 to about 10 weight percent, based on the total weight of the polyester, of at least one salt prepared by the reaction of one or more acidic phosphorus-containing compounds with one or more basic organic compounds which contain nitrogen;

wherein
the acidic phosphorus compounds are selected from the group consisting of phosphorous acid, phosphoric acid and polyphosphoric acid; and
the basic organic compounds which contain nitrogen are selected from the group consisting of compounds having the formulas:

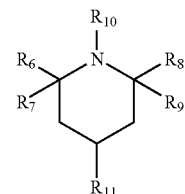

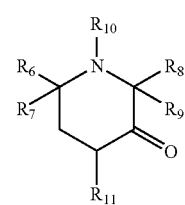

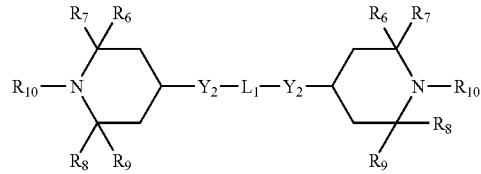

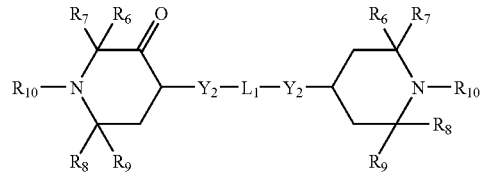

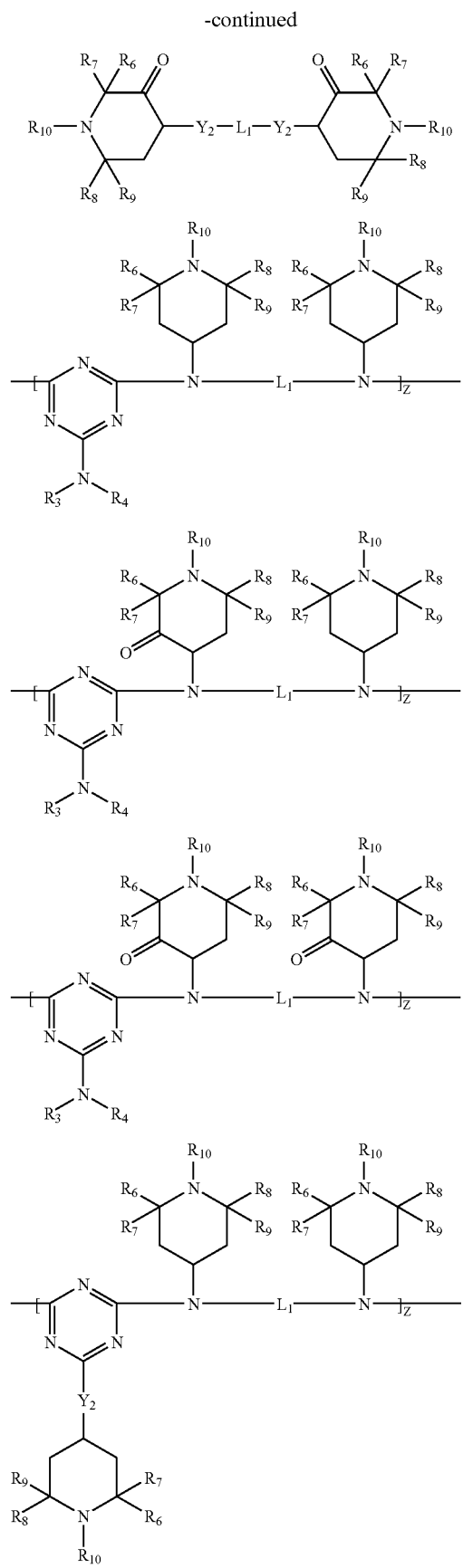
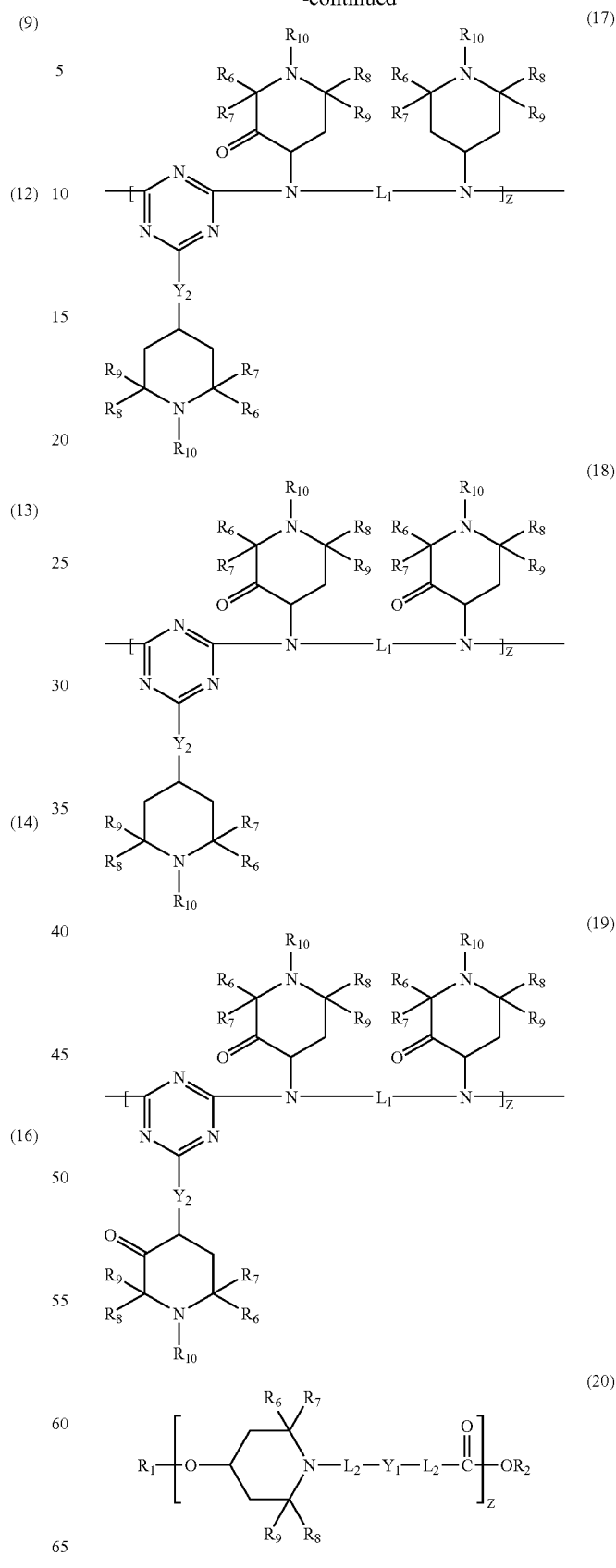

wherein
- $R_1$ and $R_2$ are independently is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_3$ and $R_4$ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of $R_3$ and $R_4$ is a substituent other than hydrogen; $R_3$ and $R_4$ collectively represent a divalent group forming a ring with the nitrogen atom to which they are attached;
- $R_6$, $R_7$, $R_8$, and $R_9$ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;
- $R_{10}$ is selected from the group consisting of hydrogen, —$OR_6$, $C_1$-$C_{22}$-alkyl, substituted $C_1$-$C_{22}$-alkyl, $C_3$-$C_8$-cycloalkyl, and substituted $C_3$-$C_8$-cycloalkyl;
- $R_{11}$ is hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —$Y_1$—$R_3$ or a succinimido group having the formula

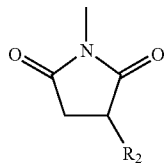

- $L_1$ is a divalent linking group selected from the group consisting of $C_2$-$C_{22}$-alkylene, —$(CH_2CH_2$—$Y_1)_{1-3}$—$CH_2CH_2$—, $C_3$-$C_8$-cycloalkylene, arylene, —CO-$L_2$-OC—;
- $L_2$ is selected from the group consisting of $C_1$-$C_{22}$-alkylene, arylene, —$(CH_2CH_2$—$Y_1)_{1-3}$—$CH_2CH_2$— and $C_3$-$C_8$-cycloalkylene;
- $Y_1$ is selected from the group consisting of —OC(O)—, —NHC(O)—, —O—, —S—, and —N($R_1$)—;
- $Y_2$ is —O— or —N($R_1$)—;
- Z is a positive integer of up to about 20;
- m1 is an integer from 0 to about 10;
- n1 is a positive integer selected from 2 to about 12;

and the ratio of the number of phosphorus atoms in the acidic phosphorus-containing compound to number of basic nitrogen atoms in the basic organic compound is about 0.05 to about 2.

42. A polymer concentrate according to claim 39 comprising:
- (A) a polyester comprising:
  - (1) diacid residues comprising at least 50 mole percent terephthalic acid residues, 1,4-cyclohexanedicarboxylic acid residues or a mixture thereof; and
  - (2) diol residues comprising at least 50 mole percent of ethylene glycol residues, cyclohexanedimethanol residues, or a mixture thereof;
  - and up to about 200 ppmw of at least one of Ti, Co or Mn residues;
  - wherein the total of the diacid residues is equal to 100 mole percent and the total of the diol residues also is equal to 100 mole percent; and
- (B) about 5 to about 10 weight percent, based on the total weight of the polyester, of at least one salt prepared by the reaction of one or more acidic phosphorus-containing compounds with one or more basic organic compounds which contain nitrogen;

wherein
the acidic phosphorus compounds is phosphorous acid; and
the basic organic compounds which contain nitrogen are selected from the group consisting of compounds having the formulas:

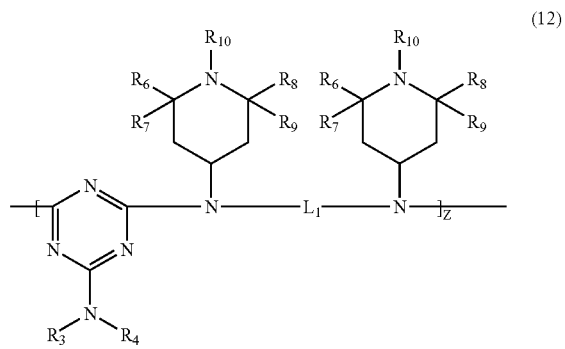

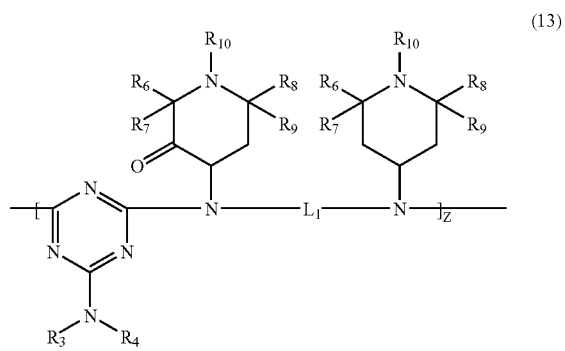

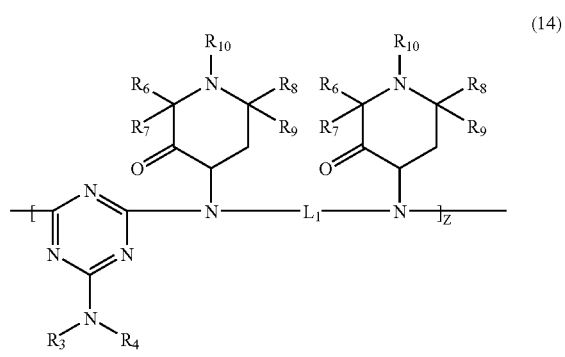

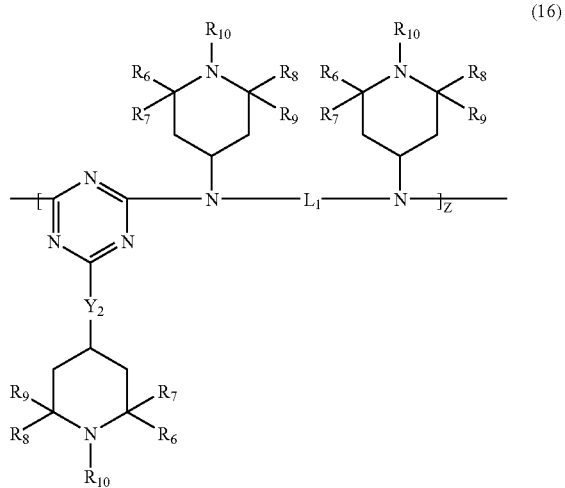

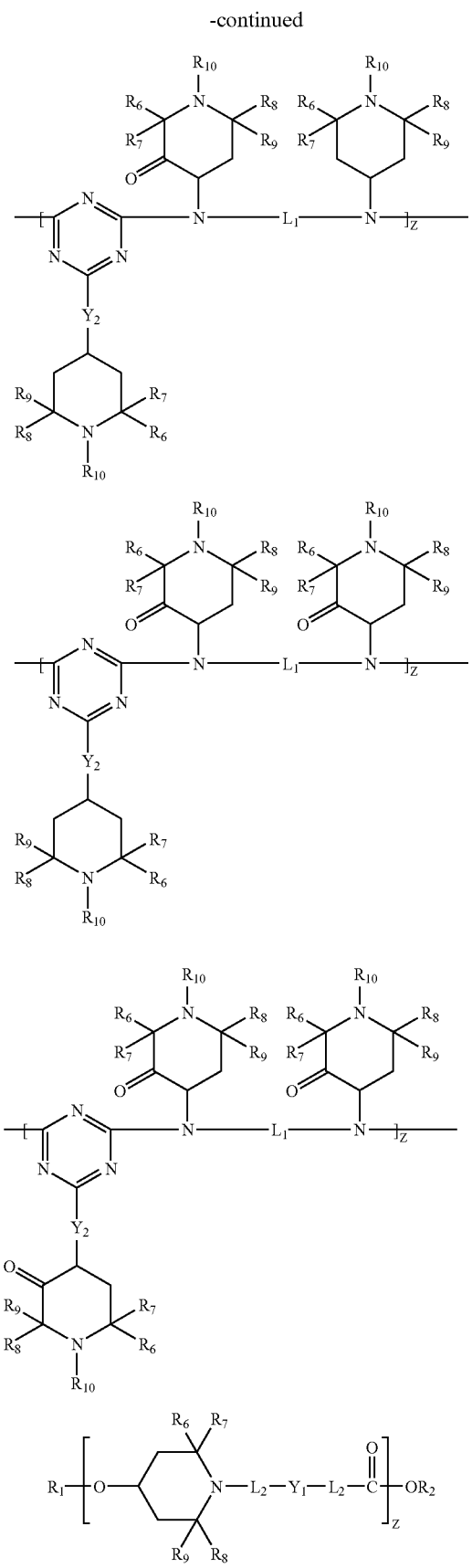

wherein
R₁ and R₂ are independently is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

R₃ and R₄ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of R₃ and R₄ is a substituent other than hydrogen; R₃ and R₄ collectively represent a divalent group forming a ring with the nitrogen atom to which they are attached;

R₆, R₇, R₈, and R₉ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

R₁₀ is selected from the group consisting of hydrogen and alkyl;

L₁ is a divalent linking group selected from the group consisting of $C_2$-$C_{22}$-alkylene, —(CH₂CH₂—Y₁)₁₋₃—CH₂CH₂—, $C_3$-$C_8$-cycloalkylene, arylene, and —CO-L₂-OC—;

L₂ is selected from the group consisting of $C_1$-$C_{22}$-alkylene, arylene, —(CH₂CH₂—Y₁)₁₋₃—CH₂CH₂— and $C_3$-$C_8$-cycloalkylene;

Y₁ is selected from the group consisting of —OC(O)—, —NHC(O)—, —O—, —S—, and —N(R₁)—;

Y₂ is —O— or —N(R₁)—;

Z is a positive integer of up to about 6;

m1 is an integer from 0 to about 10;

n1 is a positive integer from 2 to about 12;

and the ratio of the number of phosphorus atoms in the acidic phosphorus-containing compound to number of basic nitrogen atoms in the basic organic compound is about 0.05 to about 2.

43. A polymer composition comprising:

(A) at least one polyester comprising:

(1) diacid residues comprising at least 40 mole percent terephthalic acid residues; and (2) diol residues comprising from 52 to 75 mole percent of 1,4-cyclohexanedimethanol residues and 25 to 48 mole percent of ethylene glycol;

wherein the total mole percent of the diacid residues is equal to 100 mole percent and the total mole percent of the diol residues is also equal to 100 mole percent;

(B) at least one salt prepared by the reaction of one or more acidic phosphorus-containing compounds selected from the group consisting of phosphorous acid, phosphoric acid and polyphosphoric acid with one or more basic organic compounds which contain nitrogen, wherein said one or more basic organic compounds are hindered amine light stabilizers (HALS) having one of the following formulas:

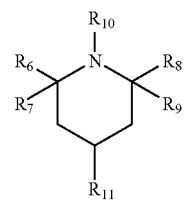

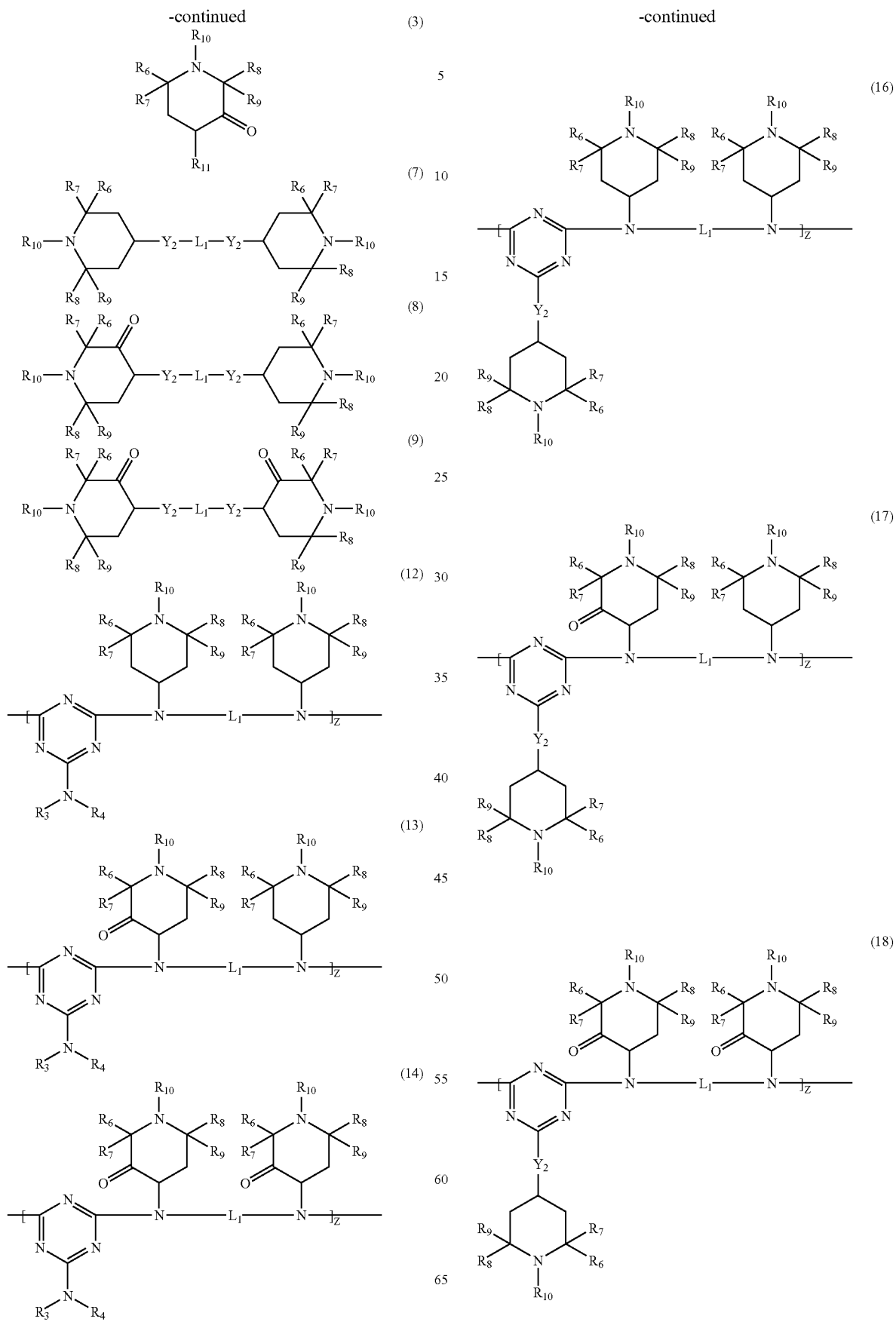

-continued

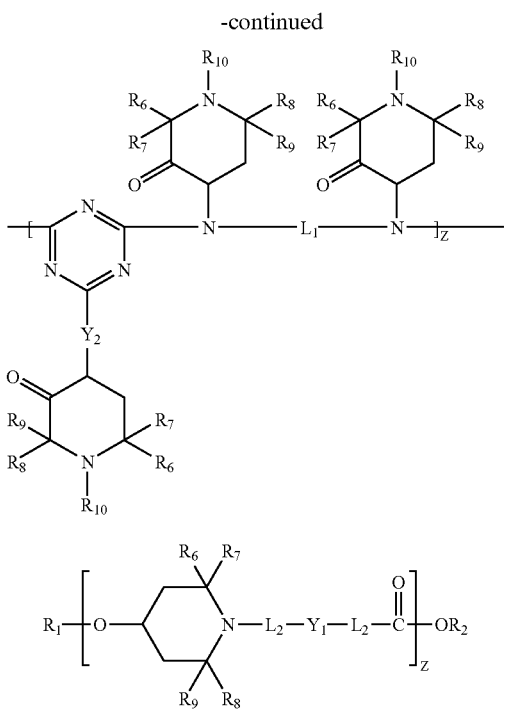

(19)

(20)

wherein
R₁ and R₂ are independently is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

R₃ and R₄ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of R₃ and R₄ is a substituent other than hydrogen; R₃ and R₄ collectively represent a divalent group forming a ring with the nitrogen atom to which they are attached;

R₆, R₇, R₈, and R₉ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

R₁₀ is selected from the group consisting of hydrogen, —OR₆, $C_1$-$C_{22}$-alkyl, substituted $C_1$-$C_{22}$-alkyl, $C_3$-$C_8$-cycloalkyl, and substituted $C_3$-$C_8$-cycloalkyl;

R₁₁ is hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, aryl, —Y₁—R₃ or a succinimido group having the formula

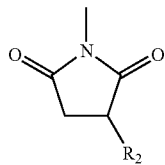

L₁ is a divalent linking group selected from the group consisting of $C_2$-$C_{22}$-alkylene, —(CH₂CH₂—Y₁)₁₋₃—CH₂CH₂—, $C_3$-$C_8$-cycloalkylene, arylene, and —CO—L₂—OC—;

L₂ is selected from the group consisting of $C_1$-$C_{22}$-alkylene, arylene, —(CH₂CH₂—Y₁)₁₋₃—CH₂CH₂— and $C_3$-$C_8$-cycloalkylene;

Y₁ is selected from the group consisting of —OC(O)—, —NHC(O)—, —O—, —S—, and —N(R₁)—;

Y₂ is —O— or —N(R₁)—;

Z is a positive integer of up to about 20;

m1 is an integer from 0 to about 10;

n1 is a positive integer from 2 to about 12;

and the ratio of the number of phosphorus atoms in the acidic phosphorus-containing compound to number of basic nitrogen atoms in the basic organic compound is about 0.05 to about 2.

44. The polymer composition of claim 43 further comprising a polycarbonate.

45. The polymer composition of claim 44 wherein the weight ratio of polyester component (A) to the polycarbonate component is about 75:25 to about 25:75.

46. A polymer composition according to claim 44 comprising:
(A) a polyester comprising:
(1) diacid residues comprising from 80 to 100 mole percent terephthalic acid residues; and
(2) diol residues comprising from 52 to 65 mole percent of 1,4-cyclohexanedimethanol residues, and 35 to 48 mole percent of ethylene glycol;
wherein the total of the diacid residues is equal to 100 mole percent and the total of the diol residues also is equal to 100 mole percent; and
(B) about 5 to about 10 weight percent, based on the total weight of the polyester, of at least one salt prepared by the reaction of one or more acidic phosphorus-containing compounds with one or more basic organic compounds which contain nitrogen;
wherein
the acidic phosphorus compounds is phosphorous acid; and
the basic organic compounds which contain nitrogen are selected from the group consisting of compounds having the formulas:

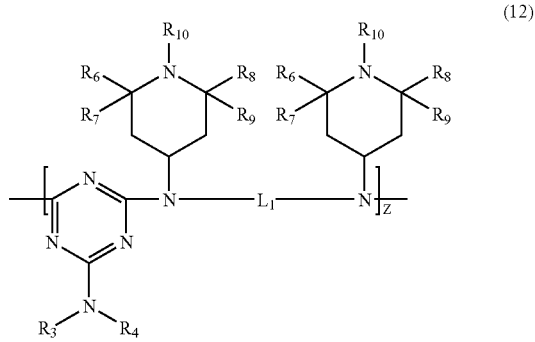

(12)

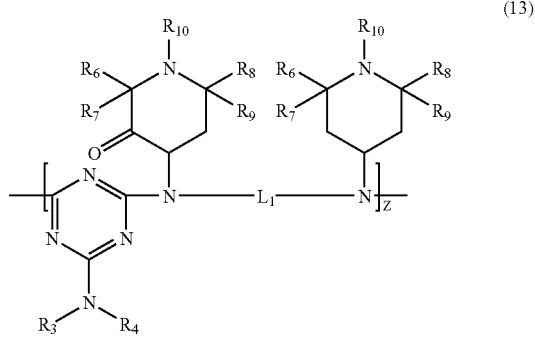

(13)

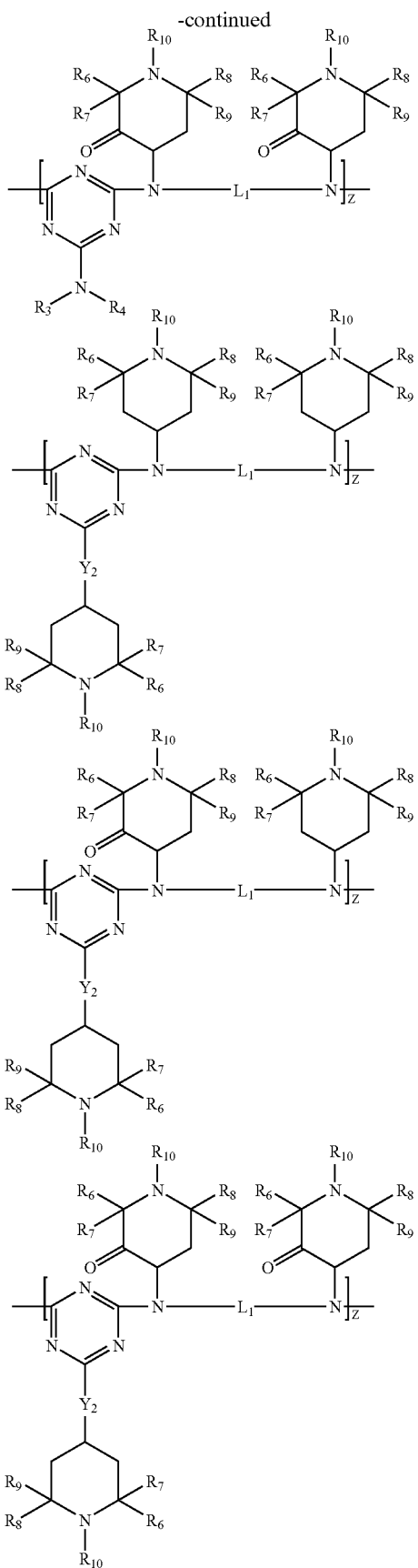
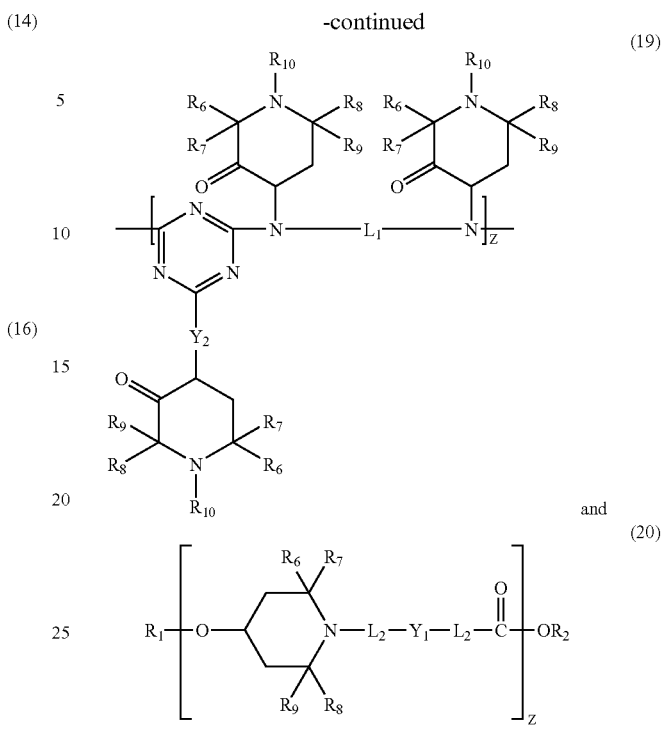

wherein
R₁ and R₂ are independently is selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

R₃ and R₄ are independently selected from the group consisting of hydrogen, $C_1$-$C_{22}$-alkyl, substituted $C_1$-$C_{22}$-alkyl, $C_3$-$C_8$-cycloalkyl, and substituted $C_3$-$C_8$-cycloalkyl wherein at least one of R₃ and R₄ is a substituent other than hydrogen; R₃ and R₄ collectively represent a divalent group forming a ring with the nitrogen atom to which they are attached;

R₆, R₇, R₈, and R₉ are independently selected from the group consisting of hydrogen, $C_1$-$C_{22}$-alkyl, substituted $C_1$-$C_{22}$-alkyl, $C_3$-$C_8$-cycloalkyl, substituted $C_3$-$C_8$-cycloalkyl, heteroaryl, and aryl;

R₁₀ is selected from the group consisting of hydrogen and alkyl;

L₁ is a divalent linking group selected from the group consisting of $C_2$-$C_{22}$-alkylene, —(CH₂CH₂—Y₁)₁₋₃—CH₂CH₂—, $C_3$-$C_8$-cycloalkylene, arylene, and —CO-L₂-OC—;

L₂ is selected from the group consisting of $C_1$-$C_{22}$-alkylene, arylene, —(CH₂CH₂—Y₁)₁₋₃—CH₂CH₂— and $C_3$-$C_8$-cycloalkylene;

Y₁ is selected from the group consisting of —OC(O)—, —NHC(O)—, —O—, —S—, and —N(R₁)—;

Y₂ is —O— or —N(R₁)—;

Z is a positive integer of up to about 6;

m1 is an integer from 0 to about 10;

n1 is a positive integer from 2 to about 12;

and the ratio of the number of phosphorus atoms in the acidic phosphorus-containing compound to the number of basic nitrogen atoms in the basic organic compound is about 0.05 to about 2.

* * * * *